(12) United States Patent
Rashid

(10) Patent No.: US 11,748,301 B2
(45) Date of Patent: Sep. 5, 2023

(54) GLOBAL TRACKING OF VIRTUAL INODE NUMBERS IN SNAP-BASED FILESYSTEMS

(71) Applicant: EMC IP Holding Company LLC, Hopkinton, MA (US)

(72) Inventor: Ahsan Rashid, Edison, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/506,306

(22) Filed: Oct. 20, 2021

(65) Prior Publication Data

US 2023/0121206 A1 Apr. 20, 2023

(51) Int. Cl.
*G06F 16/11* (2019.01)
*G06F 16/17* (2019.01)

(52) U.S. Cl.
CPC ........ G06F 16/128 (2019.01); G06F 16/1727 (2019.01)

(58) Field of Classification Search
CPC ............................ G06F 16/128; G06F 16/1727
USPC .......................................................... 707/613
See application file for complete search history.

(56) References Cited

U.S. PATENT DOCUMENTS

| | | | |
|---|---|---|---|
| 3,032,498 A1 | 10/2011 | Armangau et al. | |
| 8,200,638 B1 * | 6/2012 | Zheng | G06F 11/1469 707/681 |
| 8,407,265 B1 | 3/2013 | Scheer et al. | |
| 8,407,625 B2 | 3/2013 | Cohen et al. | |
| 3,412,688 A1 | 4/2013 | Armangau et al. | |
| 8,938,425 B1 * | 1/2015 | Armangau | G06F 16/128 707/639 |
| 8,996,490 B1 * | 3/2015 | Armangau | G06Q 30/02 709/201 |
| 9,436,693 B1 * | 9/2016 | Lockhart | G06F 16/128 |
| 9,501,487 B1 * | 11/2016 | Yuan | G06F 16/128 |
| 9,940,331 B1 * | 4/2018 | Bono | G06F 16/128 |
| 9,965,216 B1 * | 5/2018 | Jaganathan | G06F 11/1458 |
| 10,365,847 B1 * | 7/2019 | Miloslavsky | G06F 16/13 |
| 10,452,641 B1 * | 10/2019 | Batchu | G06F 16/116 |
| 10,809,932 B1 * | 10/2020 | Armangau | G06F 16/13 |
| 2007/0011137 A1 * | 1/2007 | Kodama | G06F 16/128 |
| 2008/0046476 A1 * | 2/2008 | Anderson | G06F 16/174 |
| 2008/0059541 A1 * | 3/2008 | Fachan | G06F 16/174 |
| 2009/0055604 A1 * | 2/2009 | Lemar | G06F 16/174 711/E12.001 |
| 2012/0030265 A1 * | 2/2012 | Anderson | G06F 16/1858 707/830 |
| 2017/0123937 A1 * | 5/2017 | Iwasaki | G06F 16/183 |

(Continued)

*Primary Examiner* — Phuong Thao Cao
(74) *Attorney, Agent, or Firm* — Amin, Turocy & Watson, LLP

(57) ABSTRACT

Technology described herein can globally perform management of virtual inode numbers (VINs) of all snapshots of a real filesystem. In an embodiment, a system can comprise a processor and a memory that stores executable instructions that, when executed by the processor, facilitate performance of operations. The operations can comprise, in response to a request to generate a primary snapshot of a real filesystem, allocating a primary instance of an individual VIN for a virtual inode corresponding to the primary snapshot, resulting in an allocated VIN having associated therewith a weight expressed as a value. The operations further can comprise storing the weight for the allocated VIN at a corresponding VIN metadata object exclusive to the VIN.

20 Claims, 16 Drawing Sheets

(56) References Cited

U.S. PATENT DOCUMENTS

| | | | |
|---|---|---|---|
| 2017/0262463 A1* | 9/2017 | Dar | G06F 3/067 |
| 2018/0189304 A1* | 7/2018 | Bhagwat | G06F 16/1727 |
| 2020/0133797 A1* | 4/2020 | Nanda | G06F 11/1469 |
| 2020/0250136 A1* | 8/2020 | Ballal | G06F 16/185 |
| 2021/0303528 A1* | 9/2021 | Meister | G06F 16/162 |

* cited by examiner

GLOBAL TRACKING OF VIRTUAL INODE NUMBERS IN SNAP-BASED FILESYSTEMS

BACKGROUND

Contemporary data storage systems can provide for snapshots of a namespace of a filesystem. A namespace is a point-in-time collection of files, presented as a single virtual filesystem to a user, so that a user can access a file irrespective of physical location of the file or respective directory. A snapshot is a point-in-time-copy of a file or filesystem. When a snapshot is created, e.g., based on a primary filesystem, the snapshot shares files with the primary filesystem. In general, in a filesystem that uses real index nodes (inodes) to store file metadata that reference corresponding files' data, the instances of a shared file, such as via a primary filesystem view and a snapshot view can reference the same real inode and thus can index the same shared file data.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can comprise a processor and a memory that stores executable instructions that, when executed by the processor, facilitate performance of operations. The operations can comprise, in response to a request to generate a primary snapshot of a real filesystem, allocating a primary instance of an individual virtual inode number (VIN) for a virtual inode corresponding to the primary snapshot, resulting in an allocated VIN having associated therewith a weight expressed as a value. The operations further can comprise storing the weight for the allocated VIN at a corresponding VIN metadata object exclusive to the VIN.

An example of a method can comprise identifying, by a system comprising a processor, a virtual inode number (VIN) to be deleted from a snapshot of a real filesystem based upon deletion of a virtual inode from the snapshot. The method further can comprise at least one of: releasing, by the system, the VIN from the snapshot, or returning, by the system, the VIN to an inventory group that identifies non-allocated VINs.

An example of a non-transitory computer-readable medium can comprise executable instructions that, when executed by a processor, facilitate performance of operations. The operations can comprise identifying a subspace of a storage volume as a virtual inode number (VIN) subspace, wherein the VIN subspace has a discrete size at the VIN subspace. The operations also can comprise populating the VIN subspace with a VIN metadata object having a discrete total size and indicating a total VIN weight, wherein the total VIN weight is a sum of all instance weights of all instances of a VIN corresponding to a real filesystem and linked to the VIN metadata object.

BRIEF DESCRIPTION OF THE DRAWINGS

The technology described herein is illustrated by way of example and not limited in the accompanying figures in which like reference numerals indicate similar elements.

DETAILED DESCRIPTION

Overview

Figure 1:
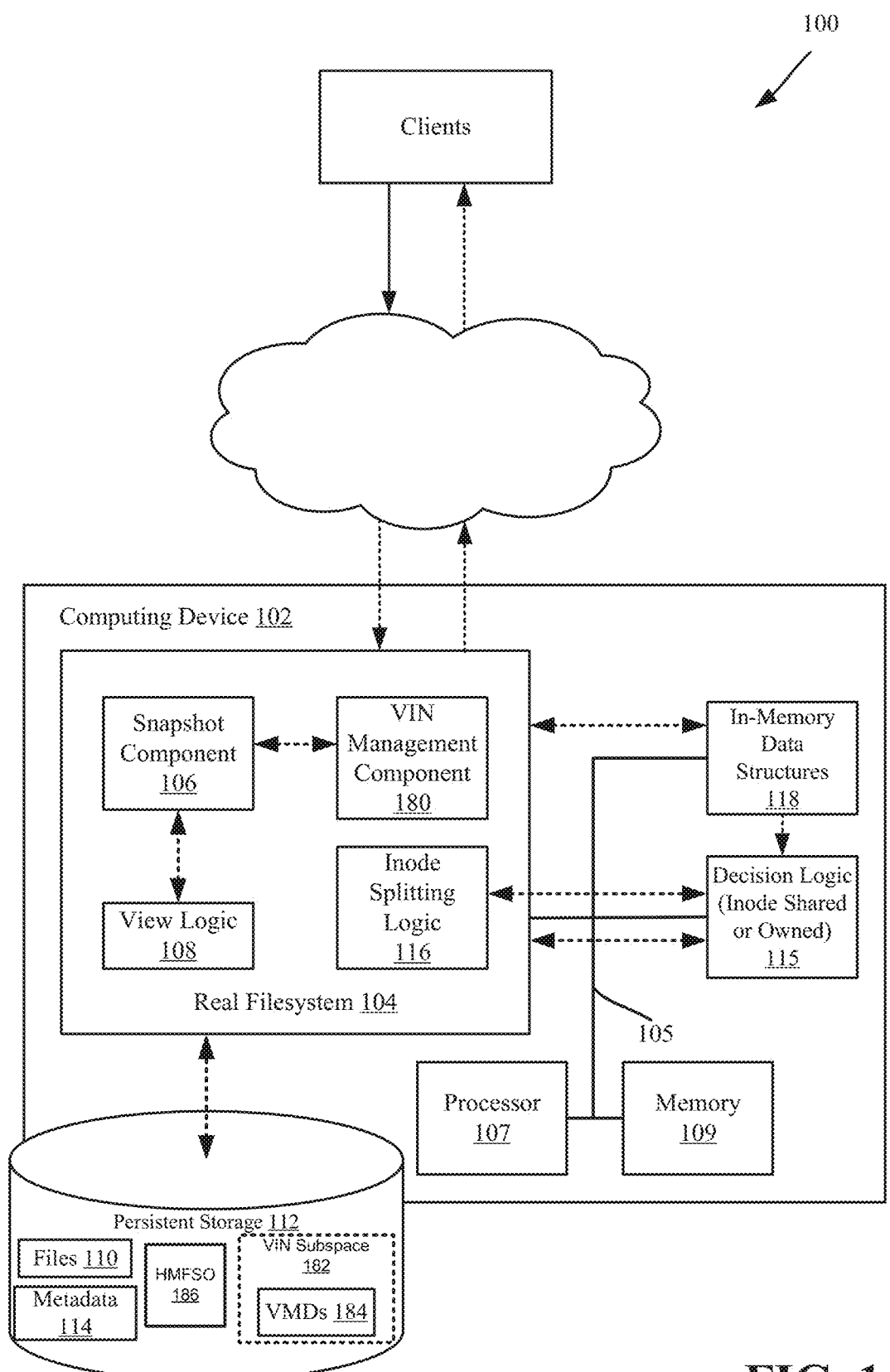
FIG. 1 illustrates a block diagram representation of example components and data—related operations in a data storage system architecture that can facilitate snapshots via shared inodes, in accordance with one or more embodiments and/or implementations described herein.

The technology described herein is generally directed towards an efficient process to find an unused (e.g., free) VIN when creating a new file or a new directory of a snapshot of a real filesystem. The technology described herein is also generally directed towards an efficient process to release a VIN when deleting a file and/or one or more other objects of a snapshot, where the efficient process makes up for one or more deficiencies of existing deletion process techniques. As will be understood, the technology described herein can include evaluating select data maintained/cached in-memory (e.g., fast RAM or the like, relative to slower storage such as persistent storage), which can provide a rapid and accurate determination of whether a file is shared or not.

It should be understood that any of the examples herein are non-limiting. As one example, one or more embodiments of technology described herein can be described using a UFS64 filesystem, in which virtual inodes can map to real inodes to facilitate file sharing across different views (e.g., snapshots) of a real filesystem's files. However, the technology described herein additionally and/or alternatively can be applied to other data storages/filesystems. As such, any of the embodiments, concepts, structures, functionalities and/or examples described herein are non-limiting. The described technology can be used in various ways that can provide benefits and advantages in computing and/or data storage in general.

For a snapshot, an inode mapping file (IMF) (also herein referred to as an inode mapping file) can be generated that can index information (e.g., data and/or metadata) regarding the real inodes of the real filesystem of which the snapshot is one view. When the snapshot is generated, virtual inodes can be generated that each can map to an individual real inode. For example a virtual inode number (VIN) of the virtual inode can map to a real inode number (RIN) of the real inode. This mapping metadata can be indexed at the IMF and referenced by a snapshot control system.

Further, when additional snapshots are generated, also of the same real filesystem, an individual IMF can be generated for and/or assigned to each of the additional snapshots, along with duplicate virtual inodes (also referred to herein as vnodes) and duplicate VINs for those virtual inodes. The VINs for one snapshot can be the same as the VINs of another snapshot, thus allowing multiple snapshots to reference the same real filesystem. Put another way, a VIN of one snapshot and a VIN of another snapshot can reference the same RIN corresponding to the same real inode of a real filesystem.

When a write operation to data or metadata of a file occurs, a real file (e.g., of the real filesystem) location can be moved. This update can be written into and stored at the IMF, thereby maintaining a link between a respective virtual inode and a respective real inode of the file, without affecting the VIN of the virtual inode. That is, a virtual inode number (VIN) of a virtual inode can be linked in the IMF to a real inode number (RIN) of a corresponding real inode.

When a virtual inode of a snapshot, or the snapshot itself, is deleted, one of the VIN duplicates can be deleted, and thus one less VIN will reference a particular RIN. Differently, when a new file is added to a snapshot (also herein referred to as a view), an unused (e.g., free) VIN and RIN are allocated for the new file, and a new VIN to RIN mapping is added to the respective IMF of the snapshot.

That is, each snapshot manages an individual and separate VIN space, keeping track of free and used VINs. Yet it will be appreciated that one or more same VINs can be used more globally, such as at more than one snapshot. With hundreds and thousands of snapshots being possible in a snap-based filesystem, management of the VINs across the snapshots can be resource-intensive, wasteful and/or difficult. Resources can include time, money, power, energy, memory and/or or processing power, among others.

One or more embodiments of devices, systems, methods and/or non-transitory machine-readable mediums are described herein that can provide a more efficient, faster and/or less resource-intensive process to managing VINs, including managing allocation, updates to, tracking, generating and/or deletion of VINs. This can be facilitated at least in part due to a VIN management system for globally managing VINs for snap-based filesystems, such as at the common layer of the core or real filesystem. Put another way, a global VIN management system can manage VINs for multiple snapshots, and thus across more than one snapshot of a real filesystem.

Briefly, a VIN management system described herein can use a distributed weight mechanism for VIN sharing. Each original VIN can have a total weight that can be stored in a corresponding VIN metadata object (VIVID). When a VIN is allocated, the file allocating the VIN stores the total weight of the VIN at a newly-generated/newly-assigned VIVID. One VIVID is generated/assigned per VIN on a global scale. That is, the same VIN can be employed at more than one snapshot of a real filesystem, but a single VIVID can be employed to manage each copy of the same VIN, and thus enable tracking of use of that same VIN across snapshots.

When a new snap view (e.g., snapshot) of a real filesystem is taken, the IMF for the most recent snap view is split, similar to the splitting of an inode. The respective weights of the RIN and VIN are distributed among the two VINs (e.g., among the two VINs' mapping pointers (MPs)) for the respective IMFs (original and new).

It will be appreciated that non-equal distribution can be used in one or more cases. For example, greater weight can be used for VINs an original snapshot (e.g., prior snapshot). Less weight can be used for VINs of the snapshot being created.

When a RIN is updated due to a write operation, the VIN remains the same, and thus, the weights of the linked VINs do not change.

When releasing a VIN from a snap view, if fully owned (e.g., exclusively owned by a snap view), the VIN is returned to an inventory and can be reused. The associated VMD is reset and an allocated bit is cleared and respective slice hierarchy is updated. If the VIN is shared, such as with one or more other snap views, as can be determined via the respective VIN weight equaling less than the respective VIVID weight, the VIN is merely released, but is not returned. VMD weight (total VIN weight) will be reduced by the released weight of the released VIN. Thus the total VIN weight will equal the VIN distributed weights left employing the same VIN, such as for different snap views.

It will be appreciated that the IMF can be updated to hold the VIN weights of VINs of the respective snap view, in addition to information also stored and/or otherwise held at the IMF, such as RIN, RIN weight and VIN itself.

As indicated, a hierarchal system can be employed for managing a VIN subspace. The hierarchal system can be tree-based such as having slices comprised of groups in turn comprised of subgroups. The VIN subspace can be a corresponding on-disk partition that stores corresponding on-disk entries (i.e., the VMDs). The VIN subspace, like the VMDs, can be employed globally for all VINs tied to a single real filesystem.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

Example Architecture

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1600 illustrated at FIG. 16. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, an example of an architecture is illustrated at 100, with description being provided below. While referring here to one or more processes, operations, facilitations and/or uses of the non-limiting system architecture 100, it will be appreciated that description provided herein, both above and below, also can be relevant to one or more other non-limiting system architectures described herein.

The non-limiting system architecture 100 can facilitate a process to manage a snapshot. FIG. 1 shows a system architecture 100 comprising a computing device 102 (which can be a group of devices such as an array of distributed computing nodes) that can include a real filesystem 104 as described herein. Typically, such computing devices can comprise operating systems, drivers, network interfaces and/or so forth, however for purposes of brevity, only components generally relevant to snapshots are illustrated in FIG. 1.

In general and as described herein, the real filesystem 104 can support a snapshot component 106, e.g., as a native filesystem component as shown, or alternatively as an external component coupled to the filesystem. When invoked, the snapshot component 106 can produce a copy of the real filesystem's snapshotted files as described herein, to provide different views of the real filesystem 104, as managed by view logic 108. In general files 110 in persistent storage 112 can be shared by having different views' virtual inodes (e.g., virtual inodes of different snapviews) reference the same real inode (stored as metadata 114) for each snapshotted file.

View logic 108 can separate the real filesystem's real files into different virtual views of the real filesystem 104. For example, a first view of the filesystem namespace can access files A, B and C, a second view can access files B, D and F, and so on; file B is thus shared by at least the first view and the second view.

When an I/O operation to a file corresponding to a view is requested by a client (device) or other entity, a filesystem identifier (ID) and a virtual inode number (VIN) for that view is specified in the file handle that is used to access the file. The VIN maps to a real inode referenced by a real inode number (RIN), by which the real file contents are accessed, such as employing a respective inode mapping file (IMF). The snapshot component 106 can manage the IMFs of each snapshot of the real filesystem 104.

For a write operation, decision logic 115 as described herein (incorporated into or coupled to the real filesystem 104) can be invoked to determine whether the real inode of the file is shared, such as with one or more virtual inodes. If so, inode splitting logic 116 can split the real inode by allocating a new real inode for the file to be modified by the write. As described herein, the decision logic 115 can access in-memory data structures to efficiently determine whether the real inode is shared or owned (not shared). This decision logic 115 can similarly be applied relative to virtual inodes.

VIN management component 180 can operate, employing the snapshot component 106, to manage VIN numbers via a hierarchal mapping system of VIN metadata objects (e.g., VIN metadata object), manage generation/assignment of VIN metadata objects (VMDs), manage updating of VMDs (such as relative to VIN duplication and/or deletion) and/or facilitate sharing of VINs with the snapshot component for indexing at respective IMFs. VIN management component 180 therefore can access a VIN subspace 182 at the persistent storage 112, where all VMDs 184 corresponding to all VINs of the real filesystem 104 can be stored. For the VMDs 184, the VIN management component 180 can update one or more descriptors of each VMD 184 in response to first allocation of a VIN (e.g., generating a primary instance of a VIN), duplication of a VIN (e.g., generating another instance of a VIN) and/or deletion of a VIN from a snapshot (e.g., deletion of an instance of a VIN from an individual snapshot).

Regarding the VIN subspace 182, the subspace can be partitioned at the persistent storage 112, such as employing the processor 107 and VIN management component 180. It will be appreciated that the subspace 182 can be partitioned from any suitable storage other than the persistent storage 112 in other embodiments. In one embodiment, the VIN subspace 182 can have a discrete and non-changing total volume that can store a plurality, such as thousands or tens of thousands, or more, of VMDs. The VMDs 184 can be managed such as by a hierarchal technique, such as a SliceMap® technology.

Regarding the VMDs 184 stored at the VIN subspace 182, each VMD can have a same size at the VIN subspace 182, such as 20 bits. In an embodiment, a VMD can be pre-generated and can thus be assigned to a VIN. Additionally and/or alternatively, VMDs can be non-pre-generated. Rather, a VMD can be generated, by the VIN management component 180, in response to allocation of a VIN, by the VIN management component 180. When no VIN remains tied to a VMD, such as when all associated vnodes have been deleted from respective snapshots, the VMD can be retained at the VIN subspace 182. In one embodiment, the VMD can retain a reference to a particular VIN. In another embodiment, any reference to a particular VIN can be deleted, truncated and/or removed from/for the VMD. In yet another embodiment, an unused VMD can be deleted from the VIN subspace 182, and its respective data block(s)/metadata block(s) returned to a respective inventory for other use for the partitioned VIN subspace 182.

Each VMD 184 can comprise at least two descriptors stored at the respective VMD 184. A first descriptor can be employed (e.g., a weight set) to reference whether any VIN is allocated corresponding to the VMD 184. Indeed the first descriptor can include a weight of 0 or 1. The second descriptor can reference a total weight that is a sum of all distributed instance weights of all VIN instances employing the VMD (e.g., of all same VINs held by different snap views). Further detail regarding management of the weights is described below.

A hierarchal mapping filesystem object (SliceMap®) 186 can be stored at the VIN subspace 182 or at the persistent storage 112, for example. The hierarchal mapping filesystem object 186 can comprise counts of free VIN numbers employed at snapshots of the real filesystem 104. Each VIN can be a number at the list or in a lookup table, and thus can use no storage space. As will be described below, the hierarchal mapping filesystem object 186 can include a count of free VINs at each level (slice, groups, sub-groups and/or the like) of the hierarchal mapping filesystem object 186 and referenced based upon a specified state of the VMDs 184, to be described in detail below. That is, the hierarchal mapping filesystem object 186 can be a single global filesystem object for all snapshots of the real filesystem 104.

Discussion now turns to the processor 107, memory 109 and bus 105 of the computing device 102.

For example, in one or more embodiments, computing device 102 can comprise a processor 107 (e.g., computer processing unit, microprocessor, classical processor and/or like processor). In one or more embodiments, a component associated with computing device 102, as described herein with or without reference to the one or more figures of the one or more embodiments, can comprise one or more computer and/or machine readable, writable and/or executable components and/or instructions that can be executed by processor 107 to facilitate performance of one or more processes defined by such component(s) and/or instruction(s). In one or more embodiments, the processor 107 can comprise the view logic 108, snapshot component 106, inode splitting logic 116 and/or decision logic 115.

In one or more embodiments, the computing device 102 can comprise a machine-readable memory 109 that can be operably connected to the processor 107. The memory 109 can store computer-executable instructions that, upon execution by the processor 107, can cause the processor 107 and/or one or more other components of the computing device 102 (e.g., view logic 108, snapshot component 106, inode splitting logic 116, decision logic 115 and/or VIN management component 180) to perform one or more actions. In one or more embodiments, the memory 109 can store computer-executable components (e.g., view logic 108, snapshot component 106, inode splitting logic 116, decision logic 115 and/or VIN management component 180).

Computing device 102 and/or a component thereof as described herein, can be communicatively, electrically, operatively, optically and/or otherwise coupled to one another via a bus 105 to perform functions of non-limiting system architecture 100, computing device 102 and/or one or more components thereof and/or coupled therewith. Bus 105 can comprise one or more of a memory bus, memory controller, peripheral bus, external bus, local bus and/or another type of bus that can employ one or more bus architectures. One or more of these examples of bus 105 can be employed to implement one or more embodiments described herein.

In one or more embodiments, computing device 102 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 107 and/or memory 109 described above, computing device 102 can comprise one or more computer and/or machine readable, writable and/or executable components and/or instructions that, when executed by processor 107, can facilitate performance of one or more operations defined by such component(s) and/or instruction(s).

Figure 2:
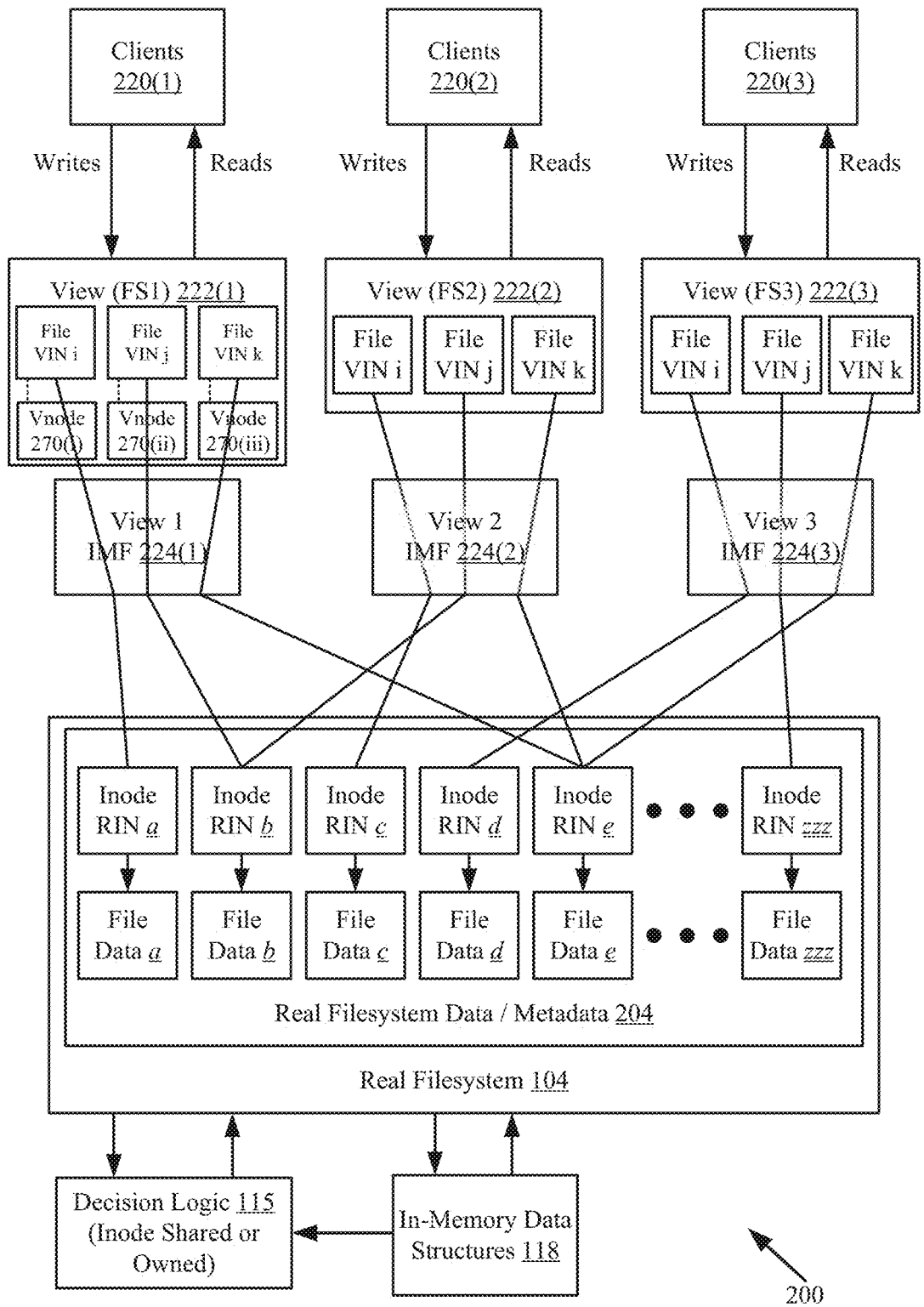
FIG. 2 illustrates an example representation of how virtual inodes of views map to real inodes to facilitate sharing of file data, in accordance with one or more embodiments and/or implementations described herein.

FIG. 2 generally illustrates additional concepts of views and shared files at diagram 200. Clients (e.g., groups of clients 220(1)-220(3) in the example) can be associated with respective views 222(1)-222(3) corresponding to virtual filesystems FS1-FS3, respectively, such as different snapshots or snapviews. To a client a view of a snapshot can appear to be a filesystem of files, although in actuality a view is ordinarily a smaller virtual subset of a real filesystem's data and metadata 204. In the example of FIG. 2, three groups of clients and views are shown, although it is understood that any practical number of views may be present in a given scenario.

The respective views 222(1)-222(3) have respective IMFs 224(1)-224(3) that map virtual inodes to the real inodes of the filesystem. This facilitates file sharing, as, for example, the real inodes numbered RIN b and RIN e (where b and e represent any appropriate real inode numbers) can correspond to file b data and file e data, respectively, which can be mapped to by more than one VIN among the views (e.g., snapshots).

When a write operation comes into the real filesystem 104 from a view, the write operation's file handle can identify a VIN, which can be mapped to a corresponding RIN associated with the file data. The real filesystem 104 uses the decision logic 115 (inode shared or owned), which accesses the in-memory data structures 118, to determine if the inode is shared or not. If shared, the inode splitting logic splits the real inode.

Figure 3:
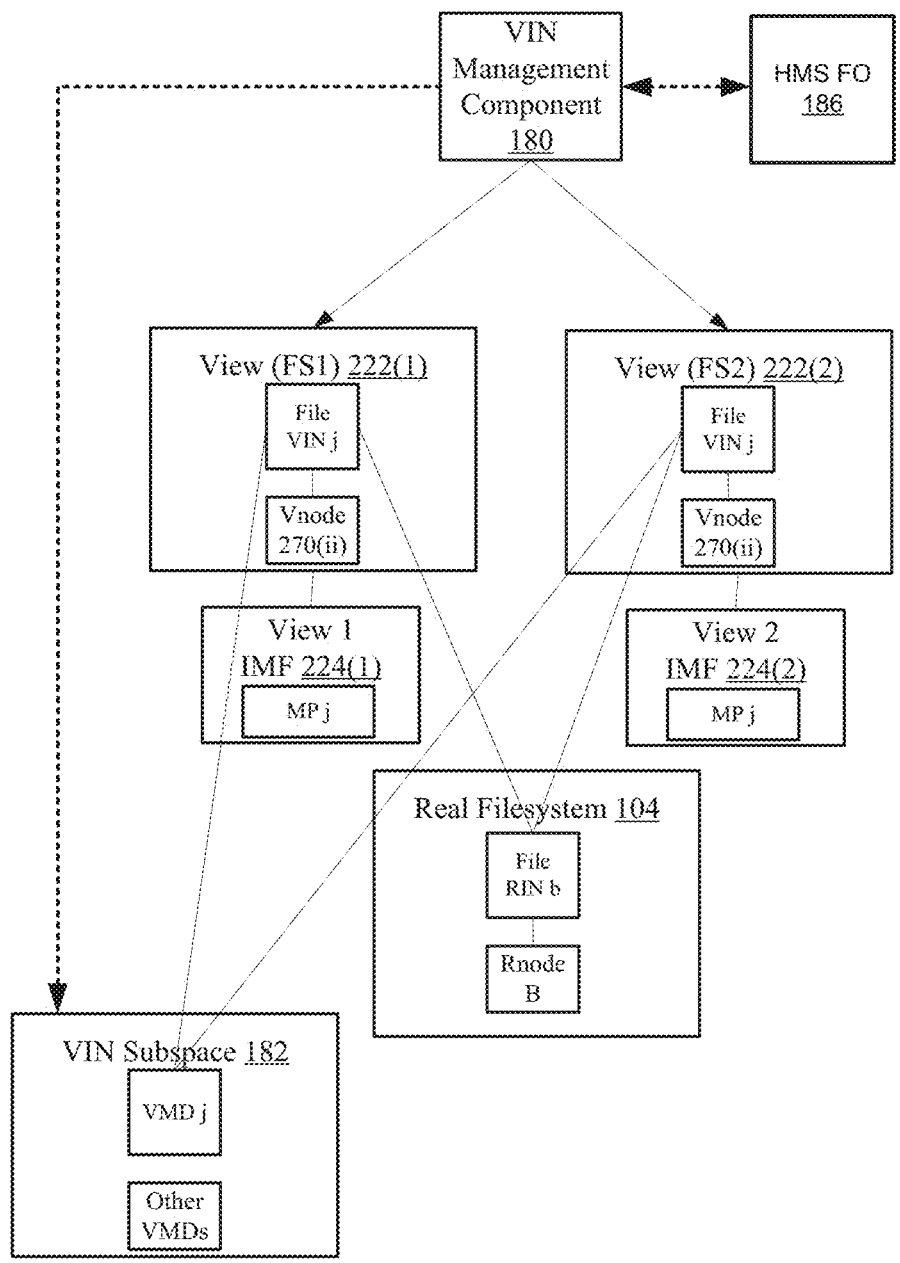
FIG. 3 illustrates a schematic diagram of virtual inode number management by the system architecture of FIG. 1, in accordance with one or more embodiments and/or implementations described herein.

Referring now to FIG. 3, but also still to both FIGS. 1 and 2, a schematic diagram 300 illustrates VIN management by the system architecture 100 and VIN management component 180 of FIG. 1, with non-arrowed lines representing links and/or references. One or more elements, objects and/or components referenced in the diagram 300 can be those of architecture 100 and/or diagram 200. Repetitive description of like elements and/or processes employed in respective embodiments is omitted for sake of brevity.

As shown at FIG. 3, VIN management component 180 can direct allocation of a VIN based upon the hierarchal mapping filesystem object 186. That is, a first instance of VIN j can be allocated to a snap view, such as view FS1 (222(1)) relative to a vnode 270(ii), for example. The vnode 270(ii) can be linked to file data b at the real filesystem 104 corresponding to a real inode B having a RIN b.

A VIN metadata object (VIVID) 184 can be generated for and/or assigned to VIN j, and thus at FIG. 3 is referenced as VMD j. The VMD j is stored at the VIN subspace 182. It will be appreciated that the vnodes 270(ii) can each comprise a mapping pointer that links to the respective VIVID j. The mapping pointers each can comprise a reference to a respective instance weight of the respective instance VIN j.

The VMD j can include a reference to a total weight including a sum of all instance weights related thereto (e.g., of all VIN j instances). Instance weights can be stored and/or referenced as mapping pointers (MPs) stored and/or referenced at the respective IMFs. For example, an MP j for the VIN j first instance can be stored at the View 1 IMF 224(1). An MP j for the VIN j second instance can be stored at the View 2 IMF 224(2). Further detail regarding the weights will be described below with reference to FIGS. 4-9.

In response to generation of a second snap view FS2 (222(2)), the vnode 270(ii) and corresponding VIN j can be duplicated (e.g., split), such that there will be two instances of VIN j. A first instance of VIN j will be held by snap view FS1 and a second instance of VIN j will be held by snap view FS2. The first and second instances of VIN j each will be associated with VMD j, because a single VMD is employed for all instances of a VIN (duplicate VINs) related to a real filesystem.

In response to deletion of the first snap view FS1 (222(1)), the associated vnode 270(ii) and first instance of VIN j can be deleted, with a corresponding adjustment being made to the VMD j. It is noted that the VIN j still will be indicated as allocated at the hierarchal mapping filesystem object 186, in view of the second instance of VIN j being held by the second snap view FS2. Only if no other snap view holds an instance of VIN j, will VIN j be indicated as non-allocated at the hierarchal mapping filesystem object 186.

Example VIN Management Operations

Figure 4:
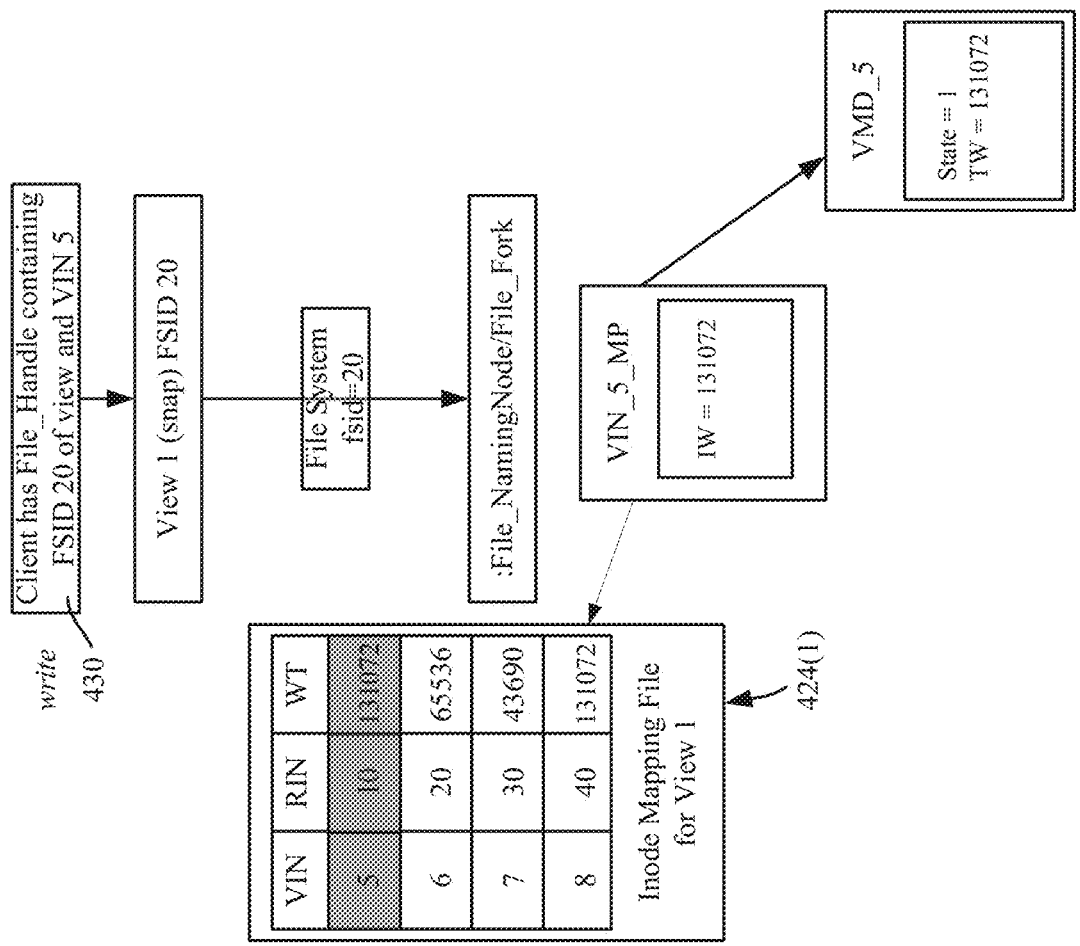
FIG. 4 illustrates a schematic diagram of allocation of a VIN relative to a primary snapshot of a real filesystem, in accordance with one or more embodiments and/or implementations described herein.

Turning now to FIG. 4, diagram 400 schematically illustrates the use of distributed weights, VMDs and mapping pointers (MPs) to manage one or more VINs, and indeed a plurality of VINs, for a real filesystem 104. One or more elements, objects and/or components referenced in the diagram 400 can be those of architecture 100 and/or diagram 200. Repetitive description of like elements and/or processes employed in respective embodiments is omitted for sake of brevity.

Diagram 400 illustrates the concept of allocating a first instance of a VIN 5. As can be seen in FIG. 4, consider that a write operation 430 comes into the view 1 side (e.g., the primary filesystem, or PFS) in which the client request comprises a file handle with a filesystem identifier (FSID) of 20 and a virtual inode number (VIN) of 5. As can be seen from the shaded portion of view 1's inode mapping table (file) 424(1), the VIN equal to 5 maps to a real inode number (RIN) 10 of a real inode by which the file data is accessible.

When the VIN 5 is allocated from the hierarchal mapping filesystem object 186 by the VIN management component 180, a corresponding VMD 5 also is generated for/assigned to and stored, by the VIN management component 180, at the associated VIN subspace 182. This assumes that a VMD is already stored at the VIN subspace 182 and thus merely is to be assigned, and not generated. A mapping pointer (MP) 5 also is generated/assigned, by the VIN management component 180, for the VIN 5, which MP 5 can be stored at the respective IMF for the View 1, and thus can be a non-space-consuming reference of the lookup table of the respective IMF. The mapping pointer (MP) for VIN 5 indicates an instance weight of the VIN 5.

That is, when a VIN is first allocated for a first instance and a corresponding VMD is generated/assigned, a total weight (TW) of all VINs is referenced as a second descriptor (TW) at the VIVID. A first descriptor of the VIVID (state) references whether any VIN is allocated that is tied/linked to that VMD. The mapping pointer for each VIN instance generated includes therewith a reference to an instance weight (IW) of the VIN.

As indicated above, each VMD at the VIN subspace has a same total size at the VIN subspace, such as 20 bits. The total size can comprise a first descriptor (state) and a second descriptor (TW). In one embodiment, the first descriptor (state) can have 1 bit and can be set, such as by a respective snapshot component, to a weight of either 1 or 0. A weight of 1 can reference that a VIN is allocated that corresponds to the VMD. A weight of 0 can reference that no VIN is allocated that corresponds to the VMD. That is, a weight of 0 can reference that no VIN is assigned to any snap view of the respective real filesystem that is linked to the VMD.

In the embodiment, the second descriptor (TW) can have a size of 19 bits, for example, with a total size of the VMD being 20 bits. The second descriptor (TW) can have a reference weight set to, for example, 131071 for a free VIN (e.g., a non-allocated VIN). The weight of the second descriptor can be set to 131072 for an allocated VIN.

Further, when the VIN is first allocated to one VIN instance, the instance weight (IW) of the respective MP is equal to the TW of the VMD. Thus the IW of the MP would be set to 131072.

It will be appreciated that in other embodiments, different value weights can be set. In one or more embodiments, different total size, first descriptor and/or second descriptor can be employed. It will be appreciated that a total size of each VMD can remain equal to allow for globally common tracking of weights, such as by the snapshot component 106.

As will be described with reference to FIGS. 6 and 7, to be detailed below, when a second instance or more of a VIN is allocated to another snap view, the TW will be distributed between all IWs. That is, where there are two instances of a VIN, each IW will be half of the TW. Alternatively, where there are three instance of a VIN, each IW will be one third of the TW.

As will be described with reference to FIGS. 8 and 9, when a VIN instance is deleted, such as when a vnode or full/partial snap view is deleted, the IW of the VIN instance is also deleted, but from the TW. Accordingly, the $TW_{remaining}$ will be equal to $TW-IW_{removed}$. As such, as each VIN instance is deleted, the $TW_{remaining}$ will continue to decrease by the respective IW of the deleted VIN, until the $TW_{remaining}$ is 0. At such point, no VINs (e.g., VIN instances) tied to the VMD will be allocated, and thus a weight of the VMD second descriptor can be reset to 131071, and a weight of the VMD first descriptor can be reset to 0, such as by the VIN management component 180.

Figure 5:
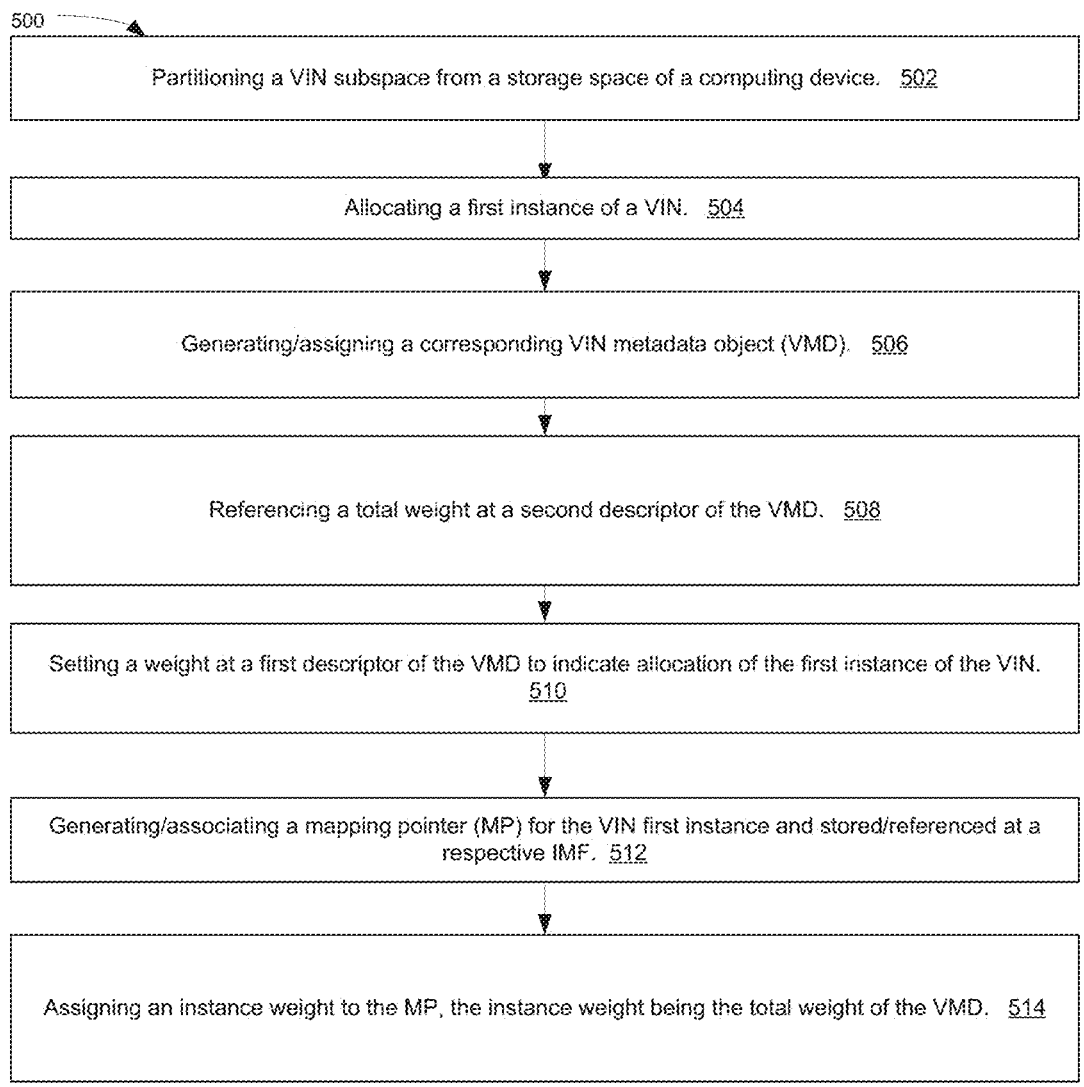
FIG. 5 illustrates a process flow diagram relative to the schematic diagram of FIG. 4, in accordance with one or more embodiments and/or implementations described herein.

Turning now to FIG. 5, a process flow comprising a set of operations is illustrated relative to FIG. 4. One or more elements, objects and/or components referenced in the process flow 500 can be those of architecture 100 and/or diagram 200. Repetitive description of like elements and/or processes employed in respective embodiments is omitted for sake of brevity.

At operation 502, a VIN subspace (e.g., VIN subspace 182) can be partitioned by the system (e.g., the processor 107 and/or VIN management component 180), from a storage space (e.g., persistent storage 112) of a computing device (e.g., computing device 102).

At operation 504, a first instance of a VIN can be allocated by the system (e.g., the VIN management component 180), such as employing a respective hierarchal mapping filesystem object HMFSO 186).

At operation 506, a corresponding VMD (e.g., VMD 184) can be generated/assigned by the system (e.g., the VIN management component 180).

At operation 508, a total weight can be referenced at a second descriptor of the VMD.

At operation 510, a weight can be set by the system (e.g., the VIN management component 180), at a first descriptor of the VMD to indicate allocation of the first instance of the VIN.

At operation 512, a mapping pointer can be generated for/associated to, by the system (e.g., VIN management component 180), the VIN first instance and stored/referenced at a respective IMF.

At operation 514, an instance weight can be assigned by the system (e.g., VIN management component 180), to the MP. Where the VIN is the first instance, the instance weight can be equal to the VMD total weight.

Figure 6:
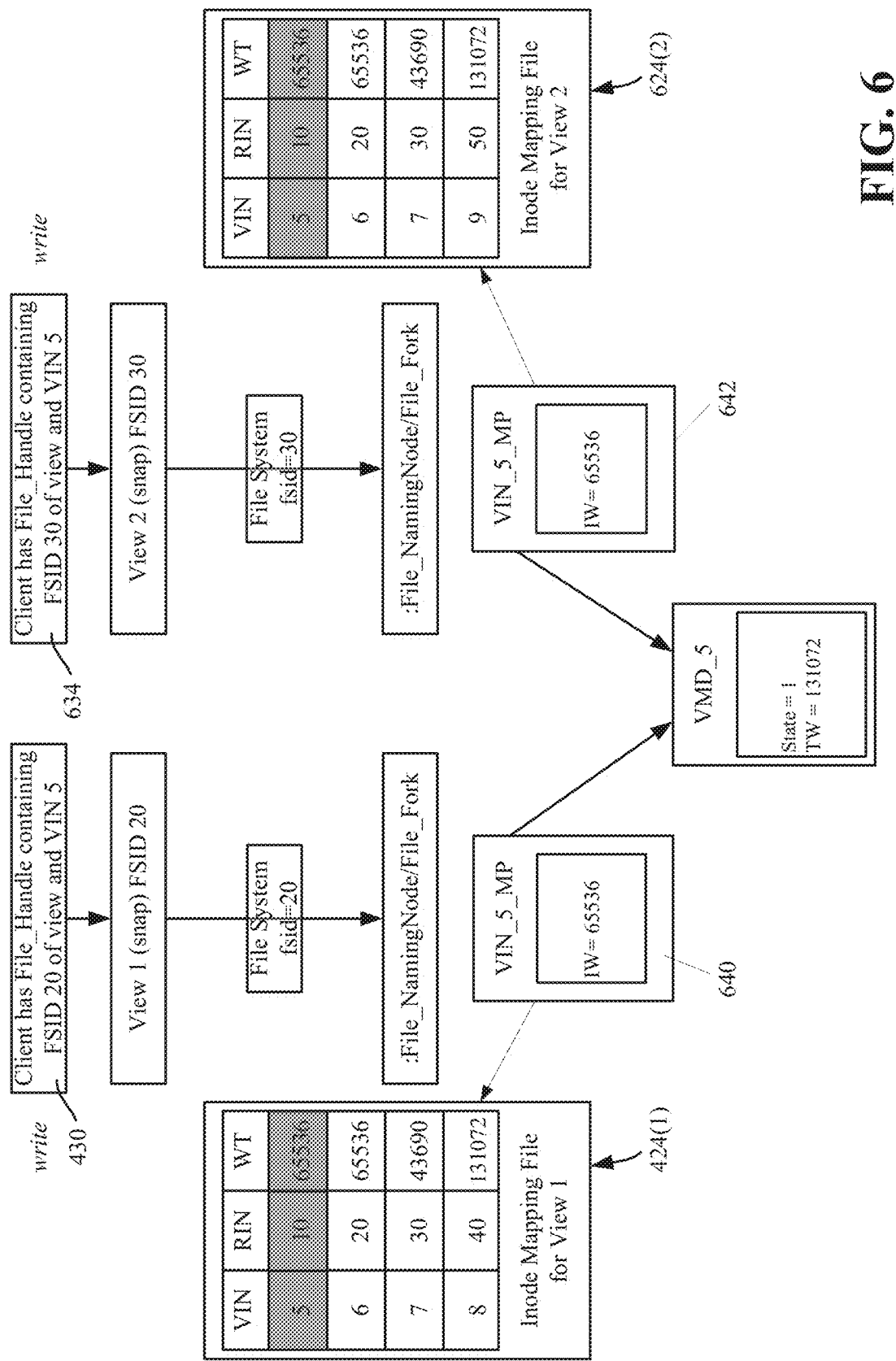
FIG. 6 illustrates a schematic diagram of duplication of a VIN related to a primary snapshot of a real filesystem for a secondary snapshot of the real filesystem, in accordance with one or more embodiments and/or implementations described herein.

Referring now to FIG. 6, consider that a write operation 634 comes into the view 2 side (e.g., the primary filesystem, or PFS) in which the client request comprises a file handle with a filesystem identifier (FSID) of 30 and a virtual inode number (VIN) of 5. As can be seen from the shaded portion of view 2's inode mapping table (file) 624(2), the VIN equal to 5 maps to the real inode number (RIN) 10 of a real inode by which the file data is accessible. Note that the view 2 side (e.g., obtained via a snapshot, or snap) references the same real inode 10, via a file handle containing an FSID of 30 and a VIN of 5, such as via a read operation 634. Thus the respective virtual inode of the View 1 having a VIN of 5 is split to generate a virtual inode for the View 2 having the VIN of 5.

Employing the VIN management component 180, an associated VIN MP 642 is generated for and/or assigned to the VIN 5 held by View 2. The MP 642 and the MP 640 (View 1) each are updated with an IW that can be comprised by a non-equally distributed portion (and/or equally distributed in one or more embodiments) of the TW of the VMD 5. That is, the TW of VMD 5 can be non-equally split into a number of portions that can sum to the number of VIN instances. That is the IW of the MP 642 is initially set at 65536, while the IW at MP 640 is reduced to 65536.

It will be appreciated that in another embodiment, were a third VIN 5 instance allocated to a third view 3 (not shown), the IWs of the MPs 640 and 642 would be reduced, such that the IWs of all three VIN 5 instances would together sum to the TW of the respective VMD 5.

Figure 7:
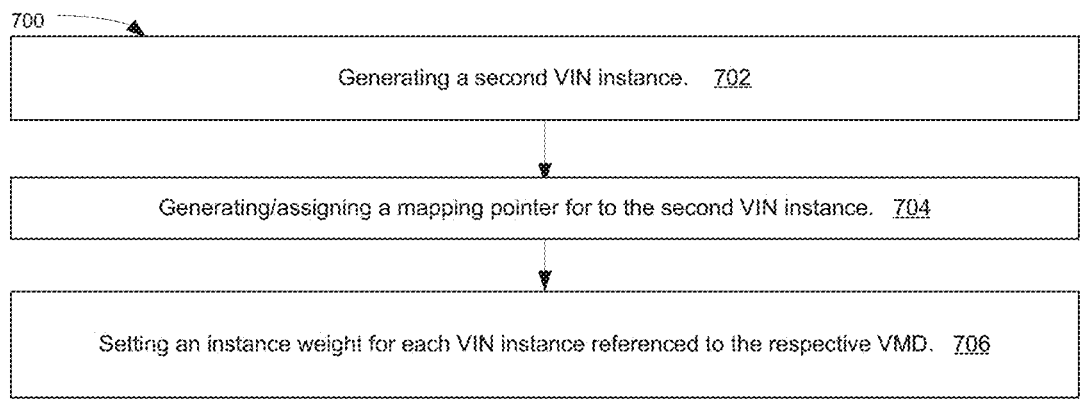
FIG. 7 illustrates a process flow diagram relative to the schematic diagram of FIG. 6, in accordance with one or more embodiments and/or implementations described herein.

Turning now to FIG. 7, a process flow comprising a set of operations is illustrated relative to FIG. 6. One or more elements, objects and/or components referenced in the process flow 700 can be those of architecture 100 and/or diagram 200. Repetitive description of like elements and/or processes employed in respective embodiments is omitted for sake of brevity.

At operation 702, a second VIN instance can be generated by the system (e.g., the VIN management component 180).

At operation 704, an MP can be generated for/assigned to the VIN instance by the system (e.g., VIN management component 180).

At operation 706, an instance weight can be set by the system (e.g., the VIN management component 180), for each VIN instance referenced to a respective VMD. Because no VIN instances have been deleted, operation 706 can comprise maintaining, by the system (e.g., VIN management component 180), a total weight set at the respective VMD.

Figure 8:
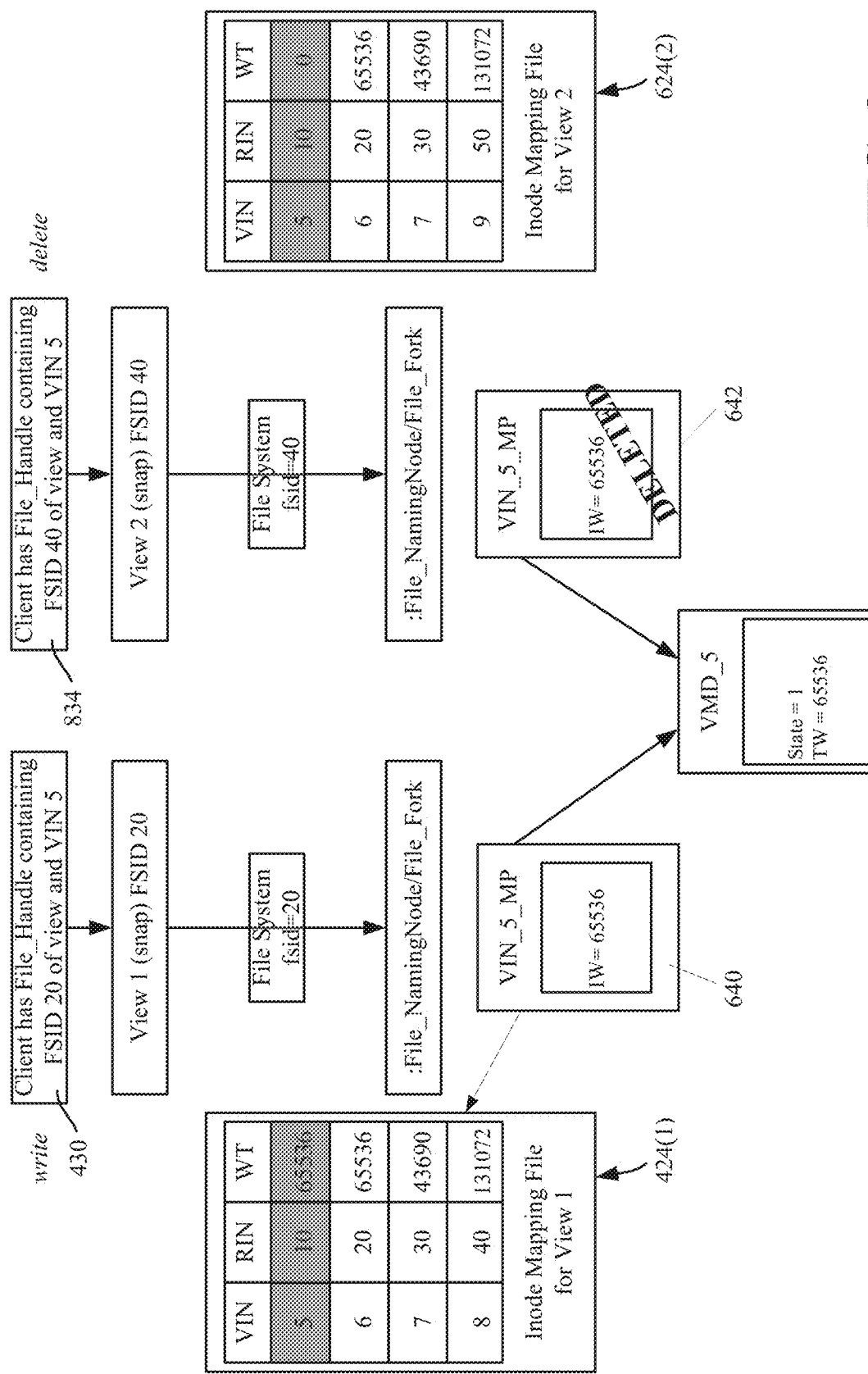
FIG. 8 illustrates a schematic diagram of deletion of a VIN relative to a primary snapshot of a real filesystem, but not from a secondary snapshot of the real filesystem, in accordance with one or more embodiments and/or implementations described herein.

Referring now to FIG. 8, consider that a write operation 834 (e.g., a delete operation) comes into the view 2 side (e.g., the primary filesystem, or PFS) in which the client request comprises a file handle with a filesystem identifier (FSID) of 40 for a virtual inode number (VIN) of 5 to delete the respective virtual inode having the VIN of 5. Such operation 834 will delete one VIN 5 tied to the VMD 5 and also tied to the RIN 10.

The VIN 5 MP 642 will be deleted from the View 2 IMF 624(2). However, a determination first is made regarding how to address the VIN and how to address the distributed weight system (e.g., how to address the VMD TW). Employing the VIN management component 180, a determination can be made as to whether the VIN 5 being deleted (based upon the deletion of an associate vnode) is shared by another snap view or if the VIN 5 is exclusively owned by the View 2. This determination can be made employing only the VMD 5.

Indeed, where the respective VIVID second descriptor has a total weight reference equal to the instance weight of the VIN to be deleted, the VIN to be deleted is exclusively owned by the snapshot holding the VIN to be deleted.

Alternatively, where the respective VIVID second descriptor references a different weight (e.g., having a greater value) than the instance weight of the VIN to be deleted, the VIN to be deleted is shared by at least one other snapshot.

Figure 10:
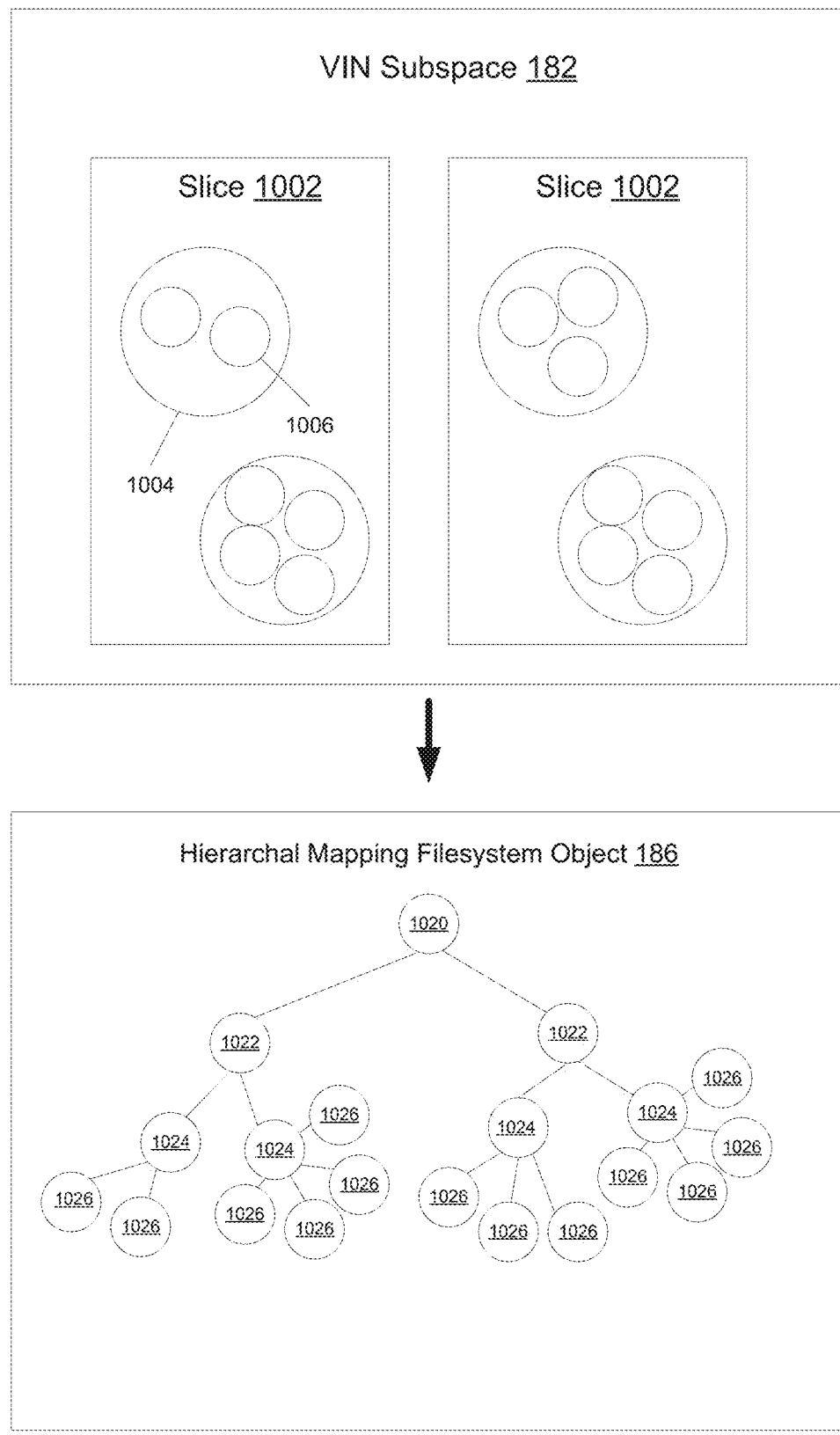
FIG. 10 illustrates a schematic diagram of a hierarchal mapping system of VIN usage relative to a real filesystem, in accordance with one or more embodiments and/or implementations described herein.
Figure 11:
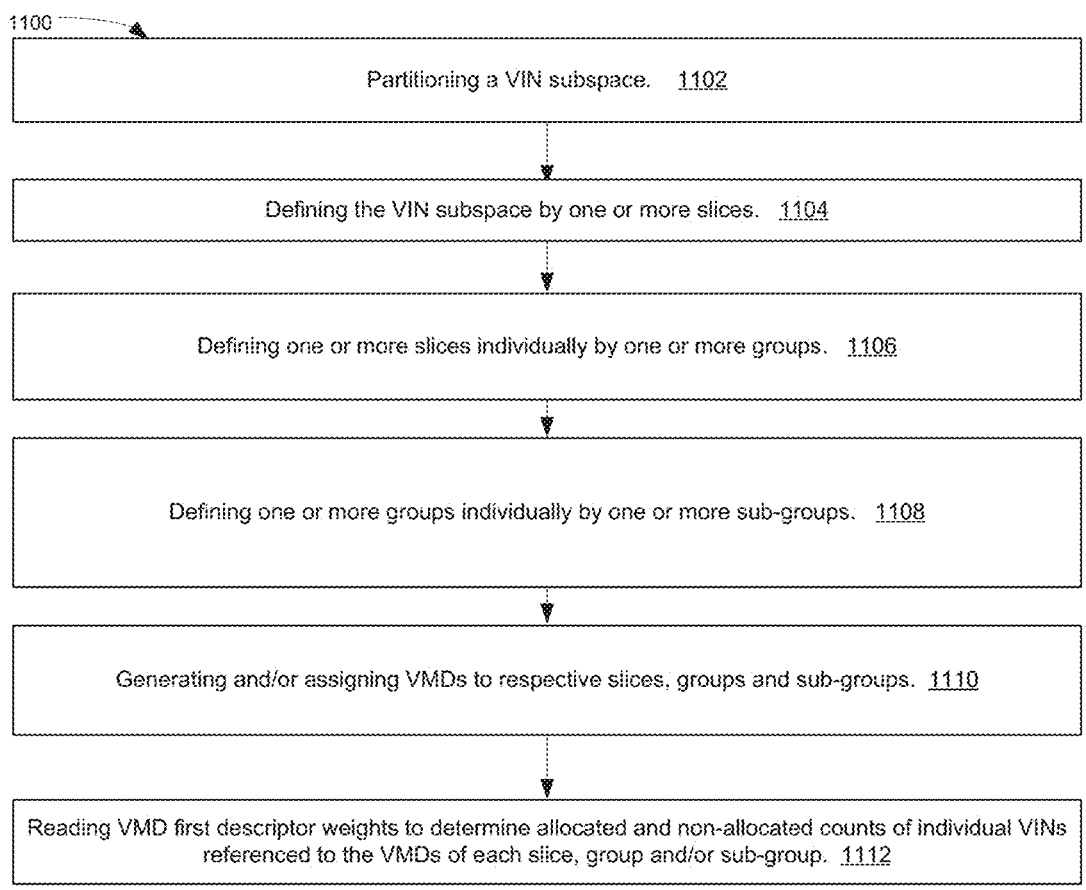
FIG. 11 illustrates a process flow diagram relative to the schematic diagram of FIG. 8, in accordance with one or more embodiments and/or implementations described herein.

Next, where a VIN is exclusively owned, the VIN can be returned to a respective VIN inventory group, to be described in further detail relative to FIGS. 10 and 11. The VIN TW can be reduced by the VIN IW of the VIN to be deleted, such as by the VIN management component 180, and thus the VIN TW will be 0. Accordingly, no VINs are allocated corresponding to the respective VIVID. The VIVID can be reset, such as by the VIN management component 180. That is, a weight of the VIVID first descriptor can be set to 0 to indicate no allocation of VINs corresponding to that VIVID. Additionally, a weight of the VIVID second descriptor can be reset to a weight of 131071, for example, to also indicate no allocation of VINs corresponding to that VIVID.

Alternatively, where the VIN is shared, the VIN can be deleted from the respective snapshot, but the VIN is not generally returned to a respective inventory group, since the VIN is still in use by at least one other snapshot. Instead, the VIN TW can be reduced by the VIN IW of the VIN to be deleted, such as by the VIN management component 180. Thus, the VIN TW at the respective VIVID will be a lower value than before the VIN was deleted, but the TW will be a non-zero value that is a sum of all IWs of VIN instances left corresponding to the respective real filesystem.

In the case of FIG. 8, the original VIN TW of the VIVID 5 (e.g., at FIG. 6) is 131072, which is greater than the IW of the VIN 5 to be deleted, which is 65536 (see, e.g., MP 642 at FIG. 8). Accordingly, the TW>IW, and thus the VIN is shared by at least one other snapshot.

Accordingly, the VIN 5 of View 2 is deleted, the VIN 5 MP 642 is deleted, and the VIVID 5 TW is reduced by the value of the IW of the VIN 5 deleted. These operations can be facilitated and/or executed by the VIN management component 180. Accordingly, the VIN TW is reduced to 65536, as shown at FIG. 8. The value of 65536 is equal to the sum of all IWs of all remaining VIN 5's allocated to that VMD 5. Indeed, only the VIN 5 of View 1 is allocated to the VMD 5, and thus the IW of the VIN 5 of view 1 (e.g., at VIN 5 MP 640) and the resulting VIN TW at VMD 5 are equal.

It will be appreciated that in another embodiment, were a third VIN 5 instance subsequently allocated to a third view 3 (not shown), after deletion of the VIN 5, the total weight of the VMD 5 would not be changed. Rather, the TW remaining would be split amongst the current IWs of current VIN 5's. Accordingly, the VIN 5 MP of View 1 and the VIN 5 MP of View 3 (not shown) each could be 32768, in one example.

Figure 9:
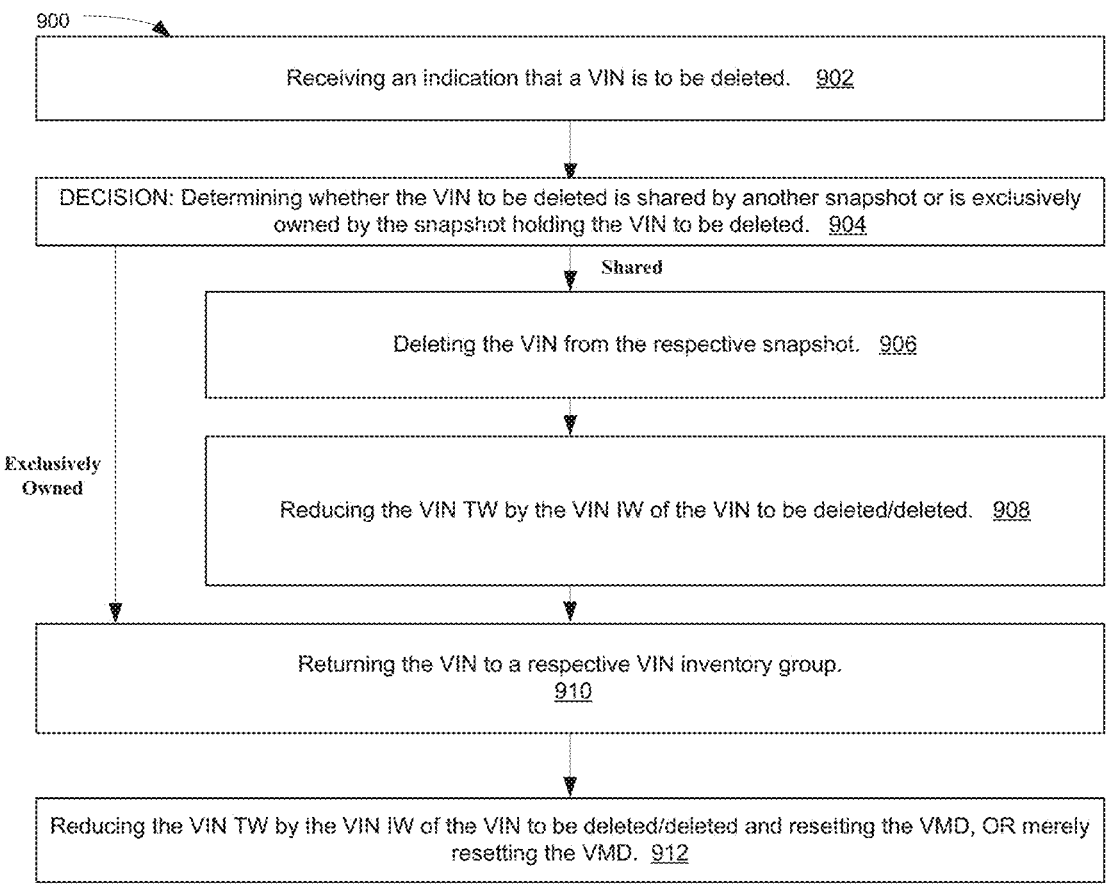
FIG. 9 illustrates a process flow diagram relative to the schematic diagram of FIG. 8, in accordance with one or more embodiments and/or implementations described herein.

Turning now to FIG. 9, a process flow comprising a set of operations is illustrated relative to FIG. 8. One or more elements, objects and/or components referenced in the process flow 900 can be those of architecture 100 and/or diagram 200. Repetitive description of like elements and/or processes employed in respective embodiments is omitted for sake of brevity.

At operation 902, an indication can be received by the system (e.g., the VIN management component 180), that a VIN is to be deleted.

At operation 904, a determination decision can be made by the system (e.g., the VIN management component 180), as to whether the VIN to be deleted is shared by another snapshot or is exclusively owned by the snapshot holding the VIN to be deleted.

Where the determination is that the VIN is shared, operation 906 can comprise deleting by the system (e.g., the VIN management component 180), the VIN from the respective snapshot.

Operation 908 can comprise reducing by the system (e.g., the VIN management component 180), the VIN TW by the VIN IW of the VIN to be deleted/deleted.

Alternatively, where the determination at operation 904 is that the VIN is exclusively owned, operation 910 can comprise returning by the system (e.g., the VIN management component 180), the VIN to a respective VIN inventory group.

Operation 912 can comprise either reducing the VIN TW by the VIN IW of the VIN to be deleted/deleted and resetting the VIVID first and second descriptors or merely resetting the VIVID first and second descriptors. That is, the reduction of the VIN TW to a zero value can be omitted in one or more embodiments.

Example of Hierarchal Management of VIN Subspace

Turning now to FIGS. 10 and 11, the hierarchal management system of the VIN subspace 182 will be described, along with a description regarding determination of free versus allocated VINs by the VIN management component 180 relative to the hierarchal mapping filesystem object 186. Repetitive description of like elements and/or processes employed in respective embodiments is omitted for sake of brevity.

Referring first to FIG. 10, VMDs 184 can be managed in a hierarchal management system employing slices, groups and sub-groups. Further sub-sub-groups and so on also can be employed. That is the VIN subspace 182 can be managed as one or more, such as a plurality of, slices 1002. Each slice 1002 can be comprised by one or more, such as a plurality of, groups 1004. Each group 1004 can be comprised by one or more, such as a plurality of, sub-groups 1006. Slices 1002, groups 1004 and sub-groups 1006 can be added as requested, limited by the discrete volume of the VIN subspace 182. Likewise, in one or more embodiments, slices, groups and/or sub-groups can have selectively or defaultly determined thresholds related to volume or related to a number of individual VMDs comprisable by each respective slice, group and/or sub-group. The VIN subspace 182, in an embodiment, can be non-immediately populated with a maximum quantity of VMDs.

Still referencing FIG. 10, the hierarchal mapping filesystem object 186 can reference the hierarchal management system of the VIN subspace 182. That is, facilitated by the VIN management component 180 reading and caching, such as at the HMFSO 186, the individual VMD first descriptors, quantities of allocated and non-allocated VINs thus far generated can be determined for the entire VIN subspace 182 and/or for any slice, group and/or sub-group. That is, VMD first descriptors of value/weight 0 reference non-allocated individual VINs, and VMD first descriptors of value/weight 1 reference allocated individual VINs.

Indeed, a root node reference 1020 at the HMFSO 186 can contain a quantity value of all allocated and/or non-allocated VMDs 184 thus far generated in the entire VIN subspace 182. One or more branch node references 1022 can branch out from the root node reference 1020 and can contain individual quantity values of allocated and/or non-allocated VMDs 184 thus far generated in each individual slice 1002. One or more sub-branch node references 1024 can branch out from one or more branch node references 1022 and can contain individual quantity values of allocated and/or non-allocated VMDs 184 thus far generated in each individual group 1004. One or more leaf node references 1026 can branch out from one or more sub-branch node references 1024 and can contain individual quantity values of allocated and/or non-allocated VMDs 184 thus far generated in each individual sub-group 1006.

Turning now to FIG. 11, a process flow comprising a set of operations is illustrated relative to FIG. 10. One or more elements, objects and/or components referenced in the process flow 1100 can be those of architecture 100 and/or diagram 200. Repetitive description of like elements and/or processes employed in respective embodiments is omitted for sake of brevity.

At operation 1102, a VIN subspace (e.g., VIN subspace 182) can be partitioned by the system (e.g., the VIN management component 180 and/or processor 107).

At operation 1104, the VIN subspace can be defined by one or more slices by the system (e.g., VIN management component 180).

At operation 1106, one or more slices can individually be defined by one or more groups by the system (e.g., VIN management component 180).

At operation 1108, one or more groups can individually be defined by one or more sub-groups by the system (e.g., VIN management component 180).

At operation 1110, VMDs can be generated and/or assigned to respective slices, groups and sub-groups by the system (e.g., VIN management component 180).

At operation 1112, VMD first descriptor weights can be read to determine allocated and non-allocated counts of individual VINs referenced to the VMDs of each slice, group and/or sub-group. That is, each first descriptor value/weight of 0 can be counted towards a count of non-allocated individual VINs. Each first descriptor value/weight of 1 can be counted towards a count of allocated individual VINs.

Example Process Flows

Figure 12:
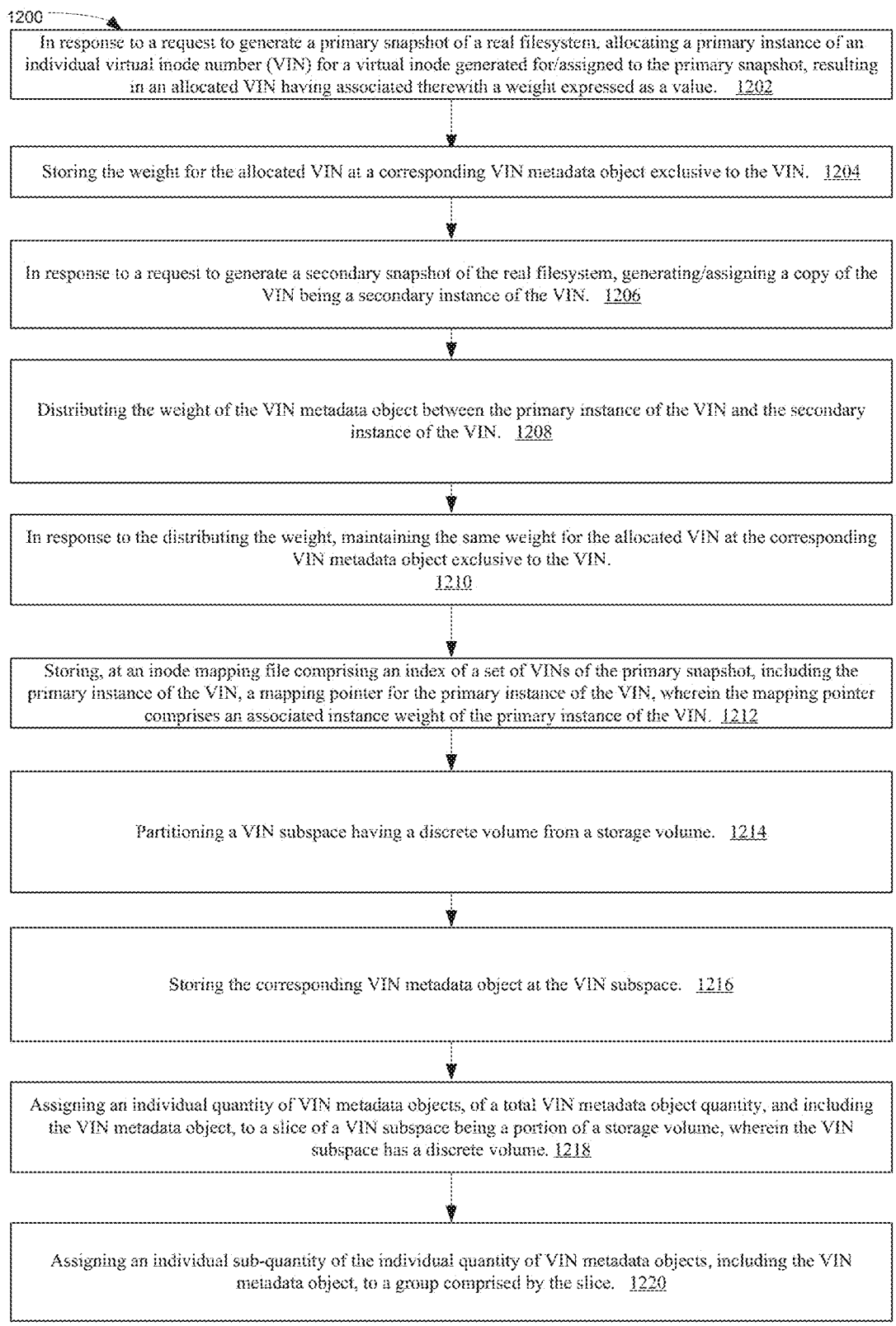
FIG. 12 illustrates a flow diagram of example operations of a process, in accordance with one or more embodiments described herein.

FIG. 12 summarizes various example operations, e.g., corresponding various operations of a process 1200 that can manage VINs of a real filesystem. Repetitive description of like elements and/or processes employed in respective embodiments is omitted for sake of brevity.

Operation 1202 can comprise, in response to a request to generate a primary snapshot of a real filesystem, allocating, by the system (e.g., VIN management component 180), a primary instance of an individual virtual inode number (VIN) for a virtual inode generated for/assigned to the primary snapshot, resulting in an allocated VIN having associated therewith a weight expressed as a value.

Operation 1204 can comprise storing, by the system (e.g., VIN management component 180), the weight for the allocated VIN at a corresponding VIN metadata object exclusive to the VIN.

Operation 1206 can comprise in response to a request to generate a secondary snapshot of the real filesystem, generating/assigning, by the system (e.g., VIN management component 180), a copy of the VIN being a secondary instance of the VIN.

Operation 1208 can comprise distributing, by the system (e.g., VIN management component 180), the weight of the VIN metadata object between the primary instance of the VIN and the secondary instance of the VIN.

Operation 1210 can comprise, in response to the distributing the weight, maintaining, by the system (e.g., VIN management component 180), the same weight for the allocated VIN at the corresponding VIN metadata object exclusive to the VIN.

Operation 1212 can comprise storing, by the system (e.g., VIN management component 180), at an inode mapping file comprising an index of a set of VINs of the primary snapshot, including the primary instance of the VIN, a mapping pointer for the primary instance of the VIN, wherein the mapping pointer comprises an associated instance weight of the primary instance of the VIN.

Operation 1214 can comprise partitioning, by the system (e.g., VIN management component 180), a VIN subspace having a discrete volume from a storage volume.

Operation 1216 can comprise storing, by the system (e.g., VIN management component 180), the corresponding VIN metadata object at the VIN subspace.

Operation 1218 can comprise assigning, by the system (e.g., VIN management component 180), an individual quantity of VIN metadata objects, of a total VIN metadata object quantity, and including the VIN metadata object, to a slice of a VIN subspace being a portion of a storage volume, wherein the VIN subspace has a discrete volume.

Operation 1220 can comprise assigning, by the system (e.g., VIN management component 180), an individual sub-quantity of the individual quantity of VIN metadata objects, including the VIN metadata object, to a group comprised by the slice.

Figure 13:
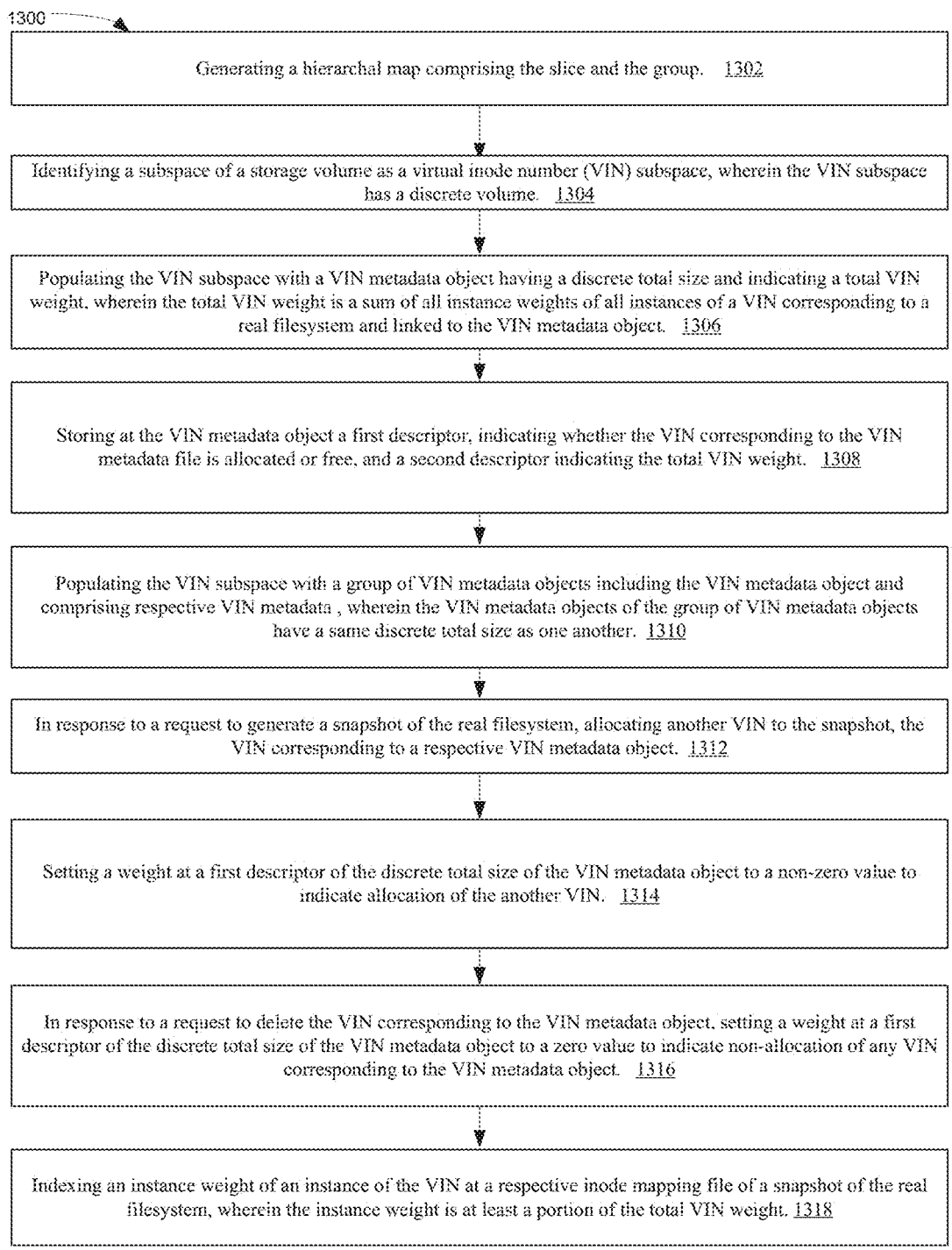
FIG. 13 illustrates a flow diagram of example operations of another process, in accordance with one or more embodiments described herein.

FIG. 13 summarizes various example operations, e.g., corresponding various operations of a process 1300 that can manage VINs of a real filesystem. Repetitive description of like elements and/or processes employed in respective embodiments is omitted for sake of brevity.

Operation 1302 can comprise generating, by the system (e.g., VIN management component 180), a hierarchal map comprising the slice and the group. A root node can identify a first total number of non-allocated VINs referenced to the total VIN metadata object quantity of the VIN subspace. A branch node branched from the root node can identify a second total number of non-allocated VINs referenced to the VIN metadata objects at the slice. A sub node (e.g., a sub-branch node) branched from the branch node can identify a third total number of non-allocated VINs referenced to the VIN metadata objects at the group.

Operation 1304 can comprise identifying, by the system (e.g., VIN management component 180), a subspace of a storage volume as a virtual inode number (VIN) subspace, wherein the VIN subspace has a discrete volume.

Operation 1306 can comprise populating, by the system (e.g., VIN management component 180), the VIN subspace with a VIN metadata object having a discrete total size and indicating a total VIN weight, wherein the total VIN weight is a sum of all instance weights of all instances of a VIN corresponding to a real filesystem and linked to the VIN metadata object.

Operation 1308 can comprise storing, by the system (e.g., VIN management component 180), at the VIN metadata object a first descriptor, indicating whether the VIN corresponding to the VIN metadata object is allocated or free, and a second descriptor indicating the total VIN weight.

Operation 1310 can comprise populating, by the system (e.g., VIN management component 180), the VIN subspace with a group of VIN metadata objects including the VIN metadata object and comprising respective VIN metadata, wherein the VIN metadata objects of the group of VIN metadata objects have a same discrete total size as one another.

Operation 1312 can comprise in response to a request to generate a snapshot of the real filesystem, allocating, by the system (e.g., VIN management component 180), another VIN to the snapshot, the VIN corresponding to a respective VIN metadata object.

Operation 1314 can comprise setting, by the system (e.g., VIN management component 180), a weight at a first descriptor of the discrete total size of the VIN metadata object to a non-zero value to indicate allocation of the another VIN.

Operation 1316 can comprise in response to a request to delete the VIN corresponding to the VIN metadata object, setting, by the system (e.g., VIN management component 180), a weight at a first descriptor of the discrete total size of the VIN metadata object to a zero value to indicate non-allocation of any VIN corresponding to the VIN metadata object.

Operation 1318 indexing, by the system (e.g., VIN management component 180), an instance weight of an instance of the VIN at a respective inode mapping file of a snapshot of the real filesystem, wherein the instance weight is at least a portion of the total VIN weight.

Figure 14:
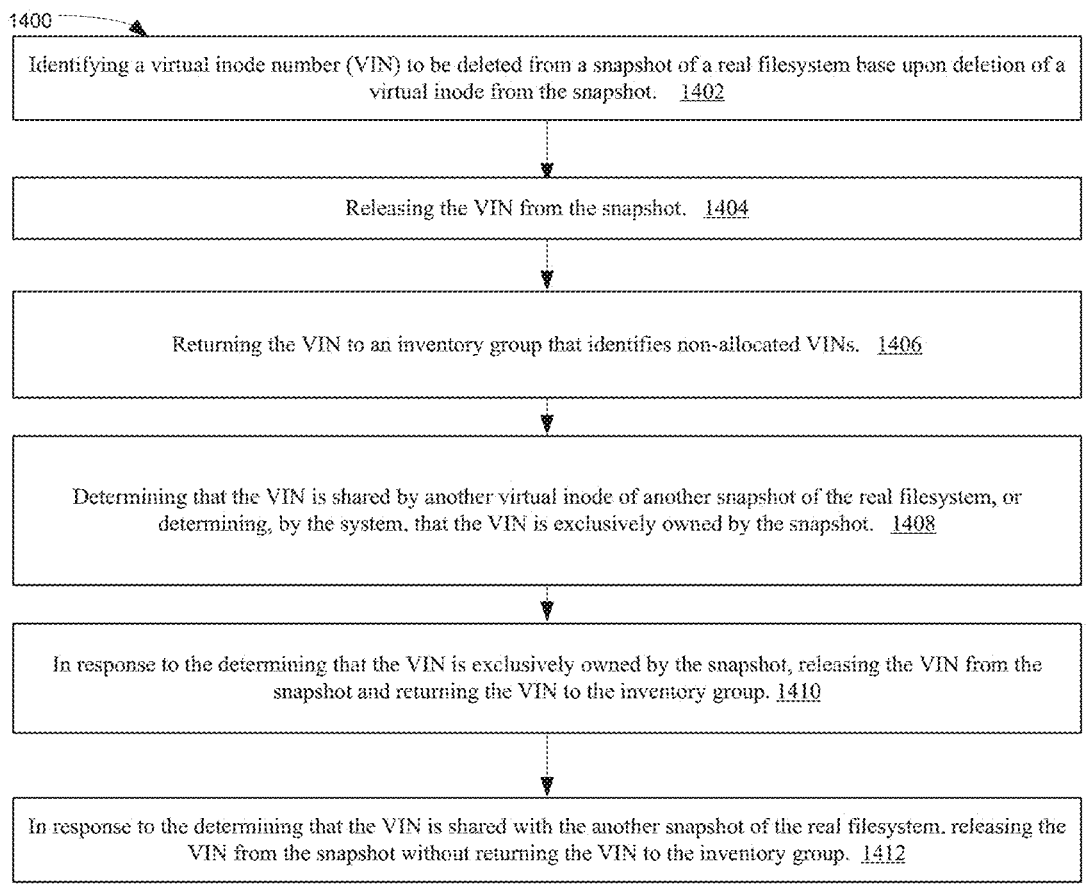
FIG. 14 illustrates a flow diagram of example operations of yet another process, in accordance with one or more embodiments described herein.

FIG. 14 summarizes various example operations, e.g., corresponding various operations of a process 1400 that can manage VINs of a real filesystem. Repetitive description of like elements and/or processes employed in respective embodiments is omitted for sake of brevity.

Operation 1402 can comprise identifying, by the system (e.g., VIN management component 180), a virtual inode number (VIN) to be deleted from a snapshot of a real filesystem based upon to deletion of a virtual inode from the snapshot.

Operation 1404 can comprise releasing, by the system (e.g., VIN management component 180), the VIN from the snapshot.

Operation 1406 can comprise returning, by the system (e.g., VIN management component 180), the VIN to an inventory group that identifies non-allocated VINs. The inventory group can reference a slice of a branch node of a hierarchal mapping system that identifies the non-allocated VINs and allocated VINs Operation 1408 can comprise determining, by the system (e.g., VIN management component 180), that the VIN is shared by another virtual inode of another snapshot of the real filesystem, or determining, by the system, that the VIN is exclusively owned by the snapshot.

Operation 1410 can comprise in response to the determining that the VIN is exclusively owned by the snapshot, releasing, by the system (e.g., VIN management component 180), the VIN from the snapshot and returning the VIN to the inventory group. The releasing can comprise adjusting a weight at a VIN metadata object associated with the VIN, the returning indicating removed allocation of the VIN.

Operation 1412 can comprise in response to the determining that the VIN is shared with the another snapshot of the real filesystem, releasing, by the system (e.g., VIN management component 180), the VIN from the snapshot without returning the VIN to the inventory group. The releasing can comprise reducing a total VIN weight at a VIN metadata object associated with the VIN by a weight of the VIN, wherein a remaining total VIN weight represented at the VIN metadata object can comprise a sum of individual weights of respective other same VINs at other snapshots of the real filesystem.

For simplicity of explanation, the computer-implemented methodologies and/or processes provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. It can be appreciated that the operations of process flows of diagrams 500, 700, 900, 1100, 1200, 1300 and/or 1400 are example operations, and that there can be one or more embodiments that implement more or fewer operations than are depicted.

Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can perform management of VINs employed for all vnodes of all snapshots of a filesystem. This global VIN management can allow for determination of VIN availability and VIN sharing, and can employ a central system (e.g., global system) that employs fewer resources than individual management of VINs corresponding to individual snapshots of a filesystem.

In an embodiment, a system can comprise a processor and a memory that stores executable instructions that, when executed by the processor, facilitate performance of operations. The operations can comprise, in response to a request to generate a primary snapshot of a real filesystem, allocating (e.g., by the respective VIN management component) a primary instance of an individual VIN for a virtual inode generated for/assigned to the primary snapshot, resulting in an allocated VIN having associated therewith a weight expressed as a value. The operations further can comprise storing (e.g., by the respective VIN management component) the weight for the allocated VIN at a corresponding VIN metadata object exclusive to the VIN (e.g., at a respective VIN subspace).

In view of employment of the one or more embodiments described herein, such as including employment of the VIN subspace and VIN management component, management of VINs, and indeed same VINs but different instances thereof, across various snapshots can be made more efficient and employ fewer resources than existing VIN management techniques. On-disk metadata objects are hierarchally managed at a central or globally-used subspace, providing a single location for determining VIN usage for any snapshot of a real filesystem. That is, VINs can be tracked at the common layer of a core filesystem. This technique is employed for VINs, even though the VINs themselves are just numbers (e.g., file offsets in IMF files) and thus have no physical on-disk footprint or disk address.

A practical application of one or more techniques performed by one or more embodiments described herein can be globally tracking VIN usage without affecting the basic core principle of snap-based filesystems that multiple snap views can have the same VIN mapped to different RINs. That is, the core principle is preserved in that directory splitting is not requested when just the contents of a file of the real filesystem is modified. VIN mapping can be adjusted, without adjusting metadata (e.g. at VMDs) related to the VINs themselves.

In one example, as one real-world result of performance of operations described herein data structures to track free and used VINs are maintained at a level of core filesystem and thus the on-disk and in-memory footprint employed by the global VIN management systems described herein does not depend upon the number of snap views generated. The data structures (e.g., VMDs) are bounded only by the size of the VIN subspace partitioned. In view of maintaining tracking at the level of core filesystem, fewer resources (e.g., power, memory, processing power and/or the like) can be employed to manage VINs. This can include allocating VINs, deleting VINs, tracking VINs, and/or determining VIN sharing, among other operations.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of data storage and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively manage VIN metadata related to a real filesystem in the time that one or more embodiments described herein can facilitate this process. And, neither can the human mind nor a human with pen and paper electronically manage VIN metadata related to a real filesystem as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Computing Environment

Figure 15:
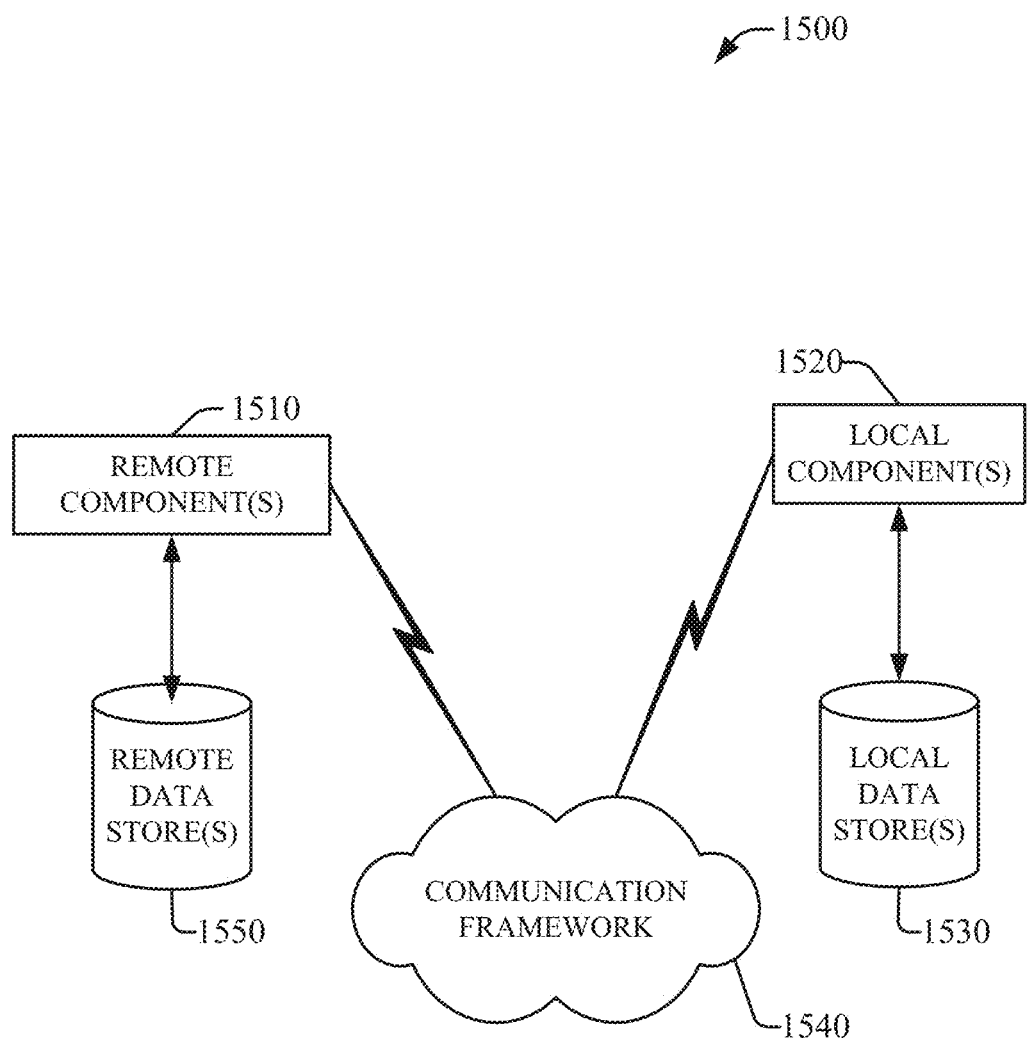
FIG. 15 illustrates a block diagram of an example computing environment into which embodiments of the subject matter described herein can be incorporated.

FIG. 15 is a schematic block diagram of a computing environment 1500 with which the described subject matter can interact. The system 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The system 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Example Operating Environment

Figure 16:
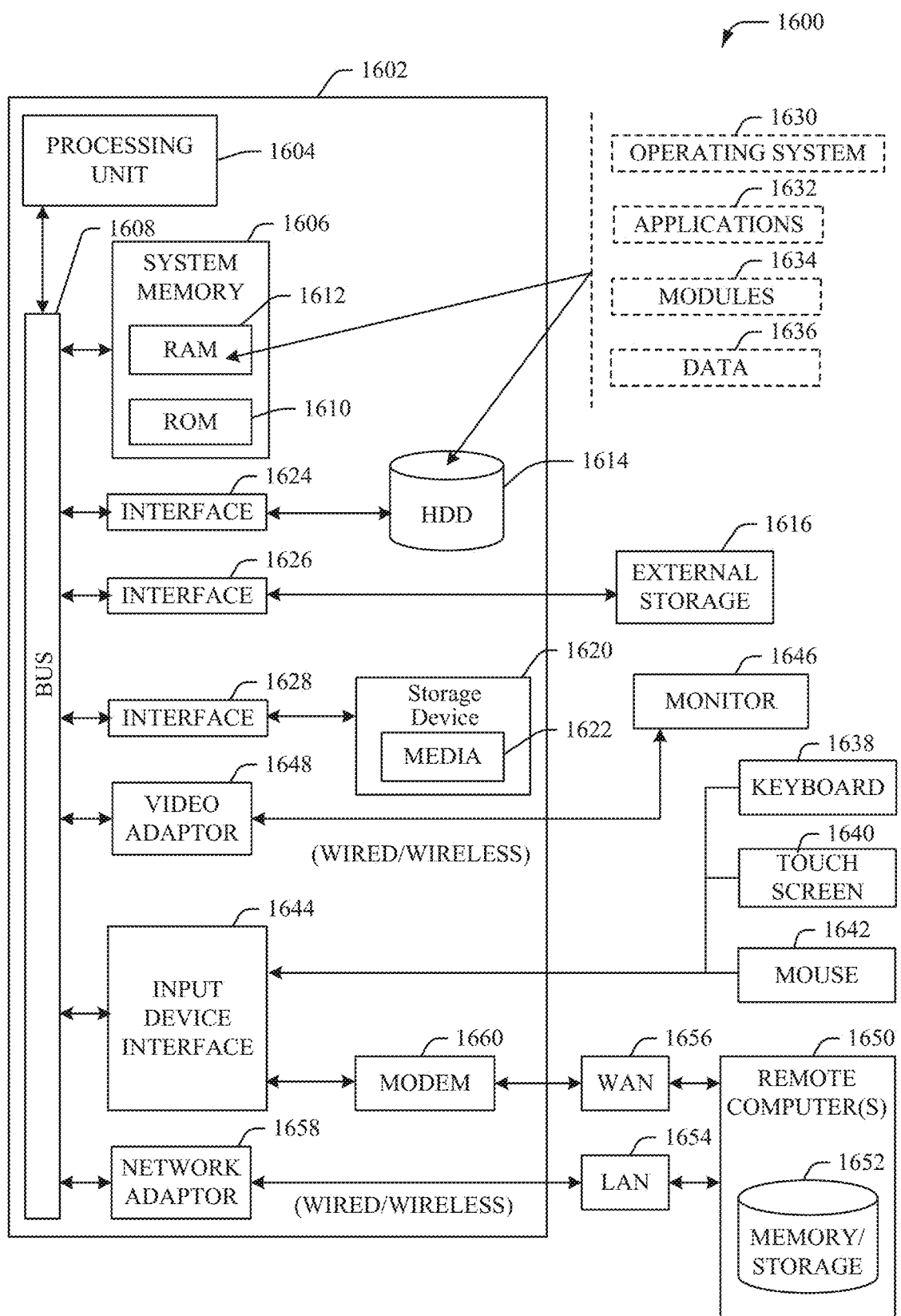
FIG. 16 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 16, the example operating environment 1600 which can implement one or more embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a nonvolatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), and can include one or more external storage devices 1616 (e.g., a magnetic floppy disk drive (FDD) 1616, a memory stick or flash drive reader, a memory card reader, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614.

Other internal or external storage can include at least one other storage device 1620 with storage media 1622 (e.g., a solid state storage device, a nonvolatile memory device, and/or an optical disk drive that can read or write from removable media such as a CD-ROM disc, a DVD, a BD, etc.). The external storage 1616 can be facilitated by a network virtual machine. The HDD 1614, external storage device(s) 1616 and storage device (e.g., drive) 1620 can be connected to the system bus 1608 by an HDD interface 1624, an external storage interface 1626 and a drive interface 1628, respectively.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the one or more specific forms described, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, comprising:
in response to a request to generate a primary snapshot of a real filesystem, allocating a primary instance of an individual virtual inode number (VIN) for a virtual inode corresponding to the primary snapshot, resulting in an allocated VIN having associated therewith a weight expressed as a value; and
storing the weight for the allocated VIN at a corresponding VIN metadata object exclusive to the VIN.

2. The system of claim 1, wherein the operations further comprise:
in response to a request to generate a secondary snapshot of the real filesystem, generating a copy of the VIN being a secondary instance of the VIN; and
distributing the weight of the VIN metadata object between the primary instance of the VIN and the secondary instance of the VIN.

3. The system of claim 2, wherein the operations further comprise:
in response to the distributing the weight, maintaining the same weight for the allocated VIN at the corresponding VIN metadata object exclusive to the VIN.

4. The system of claim 1, wherein the operations further comprise:
storing, at an inode mapping file comprising an index of a set of VINs of the primary snapshot, including the primary instance of the VIN, a mapping pointer for the primary instance of the VIN, wherein the mapping pointer comprises an associated instance weight of the primary instance of the VIN.

5. The system of claim 1, wherein the operations further comprise:
partitioning a VIN subspace having a discrete volume from a storage volume; and
storing the corresponding VIN metadata object at the VIN subspace.

6. The system of claim 1, wherein the operations further comprise:
assigning an individual quantity of VIN metadata objects, of a total VIN metadata object quantity, and including the VIN metadata object, to a slice of a VIN subspace being a portion of a storage volume, wherein the VIN subspace has a discrete volume; and
assigning an individual sub-quantity of the individual quantity of VIN metadata objects, including the VIN metadata object, to a group comprised by the slice.

7. The system of claim 6, wherein the operations further comprise:
generating a hierarchal map comprising the slice and the group, wherein the hierarchal map is defined by:
a root node identifying a first total number of non-allocated VINs referenced to the total VIN metadata object quantity of the VIN subspace,
a branch node branched from the root node, the branch node identifying a second total number of non-allocated VINs referenced to the VIN metadata objects at the slice, and
a sub node branched from the branch node, the sub node identifying a third total number of non-allocated VINs referenced to the VIN metadata objects at the group.

8. A non-transitory machine-readable medium, comprising executable instructions that, when executed by a processor facilitate performance of operations, comprising:
identifying a subspace of a storage volume as a virtual inode number (VIN) subspace, wherein the VIN subspace has a discrete volume; and
populating the VIN subspace with a VIN metadata object having a discrete total size and indicating a total VIN weight, wherein the total VIN weight is a sum of all instance weights of all instances of a VIN corresponding to a real filesystem and linked to the VIN metadata object.

9. The non-transitory machine-readable medium of claim 8, wherein the operations further comprise:
storing at the VIN metadata object a first descriptor indicating whether the VIN corresponding to the VIN metadata object is allocated or free, and a second descriptor indicating the total VIN weight.

10. The non-transitory machine-readable medium of claim 8, wherein the operations further comprise:
populating the VIN subspace with a group of VIN metadata objects including the VIN metadata object and comprising respective VIN metadata, wherein the VIN metadata objects of the group of VIN metadata objects have a same discrete total size as one another at the VIN subspace.

11. The non-transitory machine-readable medium of claim 8, wherein the operations further comprise:
in response to a request to generate a snapshot of the real filesystem, allocating another VIN to the snapshot, the VIN corresponding to a respective VIN metadata object; and
setting a weight at a first descriptor stored at the VIN metadata object to a non-zero value to indicate allocation of the another VIN.

12. The non-transitory machine-readable medium of claim 8, wherein the operations further comprise:
in response to a request to delete the VIN corresponding to the VIN metadata object, setting a weight at a first descriptor stored at the VIN metadata object to a zero value to indicate non-allocation of any VIN corresponding to the VIN metadata object.

13. The non-transitory machine-readable medium of claim 8, wherein the operations further comprise:
indexing an instance weight of an instance of the VIN at a respective inode mapping file of a snapshot of the real filesystem, wherein the instance weight is at least a portion of the total VIN weight.

14. A method, comprising:
identifying, by a system comprising a processor, a virtual inode number (VIN) to be deleted from a snapshot of a real filesystem based upon deletion of a virtual inode from the snapshot; and
releasing, by the system, the VIN from the snapshot, wherein the releasing comprises adjusting a weight at a VIN metadata object exclusive to the VIN and stored at a VIN subspace that is a subspace of a storage volume.

15. The method of claim 14, further comprising:
determining, by the system, that the VIN is shared by another virtual inode of another snapshot of the real filesystem, or
determining, by the system, that the VIN is exclusively owned by the snapshot.

16. The method of claim 15, further comprising:
in response to the determining that the VIN is exclusively owned by the snapshot, after releasing the VIN from the snapshot, further returning the VIN to an inventory group that identifies non-allocated VINs.

17. The method of claim 15, further comprising:
in response to the determining that the VIN is shared with the another snapshot of the real filesystem, releasing, by the system, the VIN from the snapshot without returning the VIN to an inventory group that identifies non-allocated VINs.

18. The method of claim 17, wherein the releasing comprises reducing a total VIN weight at the VIN metadata object associated with the VIN by a weight of the VIN.

19. The method of claim 18, wherein a remaining total VIN weight represented at the VIN metadata object comprises a sum of individual weights of respective other same VINs at other snapshots of the real filesystem.

20. The method of claim 16, wherein the inventory group references a slice of a branch node of a hierarchal mapping system that identifies the non-allocated VINs and allocated VINs.

* * * * *